United States Patent
Tserodze et al.

(10) Patent No.: US 9,153,860 B2
(45) Date of Patent: Oct. 6, 2015

(54) MECHANICAL SUPPORT RING STRUCTURE

(75) Inventors: Shota Tserodze, Tbilisi (GE); Nodar Tsignadze, Tbilisi (GE); Elguja Medzmariashvili, Tbilisi (GE); Leri Datashvili, Garching (DE); Julian B. Santiago Prowald, Wassenaar (NL)

(73) Assignee: EUROPEAN SPACE AGENCY, Paris (FR)

( * ) Notice: Subject to any disclaimer, the term of this patent is extended or adjusted under 35 U.S.C. 154(b) by 0 days.

(21) Appl. No.: 14/385,412

(22) PCT Filed: Mar. 15, 2012

(86) PCT No.: PCT/EP2012/054618
§ 371 (c)(1),
(2), (4) Date: Sep. 15, 2014

(87) PCT Pub. No.: WO2013/135298
PCT Pub. Date: Sep. 19, 2013

(65) Prior Publication Data
US 2015/0060605 A1    Mar. 5, 2015

(51) Int. Cl.
*H01Q 1/28*  (2006.01)
*E04B 1/344*  (2006.01)
*F24J 2/52*  (2006.01)
*H01Q 15/16*  (2006.01)
(Continued)

(52) U.S. Cl.
CPC ............. *H01Q 1/288* (2013.01); *E04B 1/344* (2013.01); *F24J 2/523* (2013.01); *H01Q 15/161* (2013.01); *E04H 15/50* (2013.01); *F24J 2002/5277* (2013.01); *F24J 2002/5486* (2013.01); *Y02E 10/47* (2013.01)

(58) Field of Classification Search
CPC .................................................... H01Q 15/161
USPC ............. 244/159.4, 159.5, 159.6, 172.6, 120, 244/119, 122 A, 158.1, 172.7, 173.3
See application file for complete search history.

(56) References Cited

U.S. PATENT DOCUMENTS 4,482,900 A * 11/1984 Bilek et al. .................... 343/915
4,896,165 A * 1/1990 Koizumi ........................ 343/881
(Continued)

FOREIGN PATENT DOCUMENTS

| GR | P 2011 5298 B | 10/2011 |
| RU | 2 214 659 C2 | 10/2003 |
| WO | WO 03/003517 A1 | 1/2003 |

OTHER PUBLICATIONS

Sep. 16, 2014 International Preliminary Report on Patentability issued in International Application No. PCT/EP2012/054618.
(Continued)

*Primary Examiner* — Justin Benedik
(74) *Attorney, Agent, or Firm* — Oliff PLC

(57) ABSTRACT

A mechanical support ring structure for supporting a deployable space reflector antenna. The mechanical support ring structure is convertible from a folded state into a deployed state and includes a ring-shaped pantograph having a plurality of circumferentially arranged pantograph sections which are deployable for converting the mechanical support ring structure from the folded state into the deployed state, and a plurality of circumferentially arranged support rods, each pantograph section being arranged between a respective pair of support rods, wherein each pantograph section includes one or more pairs of pantograph rods which intersect crosswise with each other at a respective crossing position.

22 Claims, 18 Drawing Sheets

(51) Int. Cl.
*F24J 2/54* (2006.01)
*E04H 15/50* (2006.01)

(56) References Cited

U.S. PATENT DOCUMENTS

| | | | | |
|---|---|---|---|---|
| 5,228,258 A | * | 7/1993 | Onoda et al. | 52/646 |
| 5,680,145 A | * | 10/1997 | Thomson et al. | 343/915 |
| 6,028,570 A | * | 2/2000 | Gilger et al. | 343/915 |
| 6,225,965 B1 | * | 5/2001 | Gilger et al. | 343/915 |
| 6,323,827 B1 | * | 11/2001 | Gilger et al. | 343/915 |
| 6,637,702 B1 | * | 10/2003 | McCandless | 244/172.6 |
| 7,644,721 B2 | * | 1/2010 | Hoberman et al. | 135/144 |
| 7,686,255 B2 | * | 3/2010 | Harris | 244/159.5 |

OTHER PUBLICATIONS

Jan. 17, 2013 International Search Report issued in International Application No. PCT/EP2012/054618.

* cited by examiner

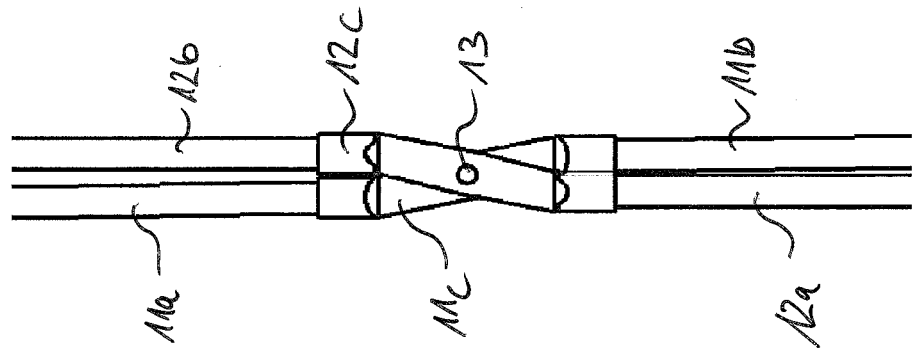
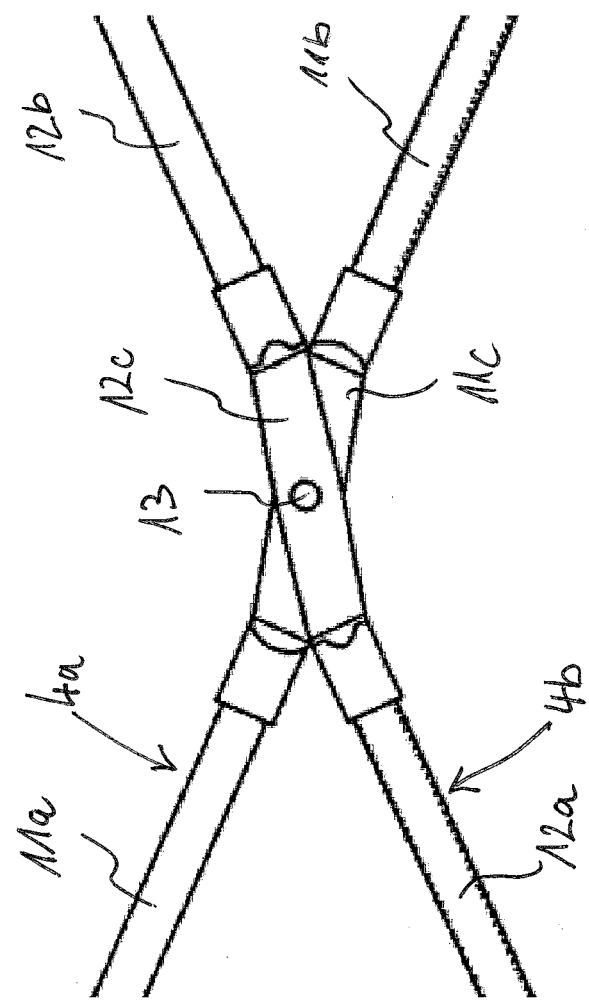

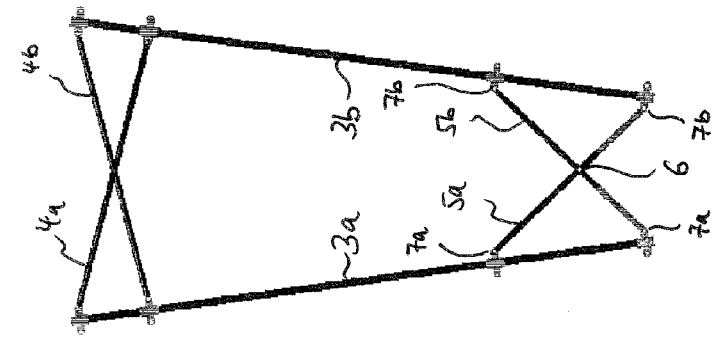
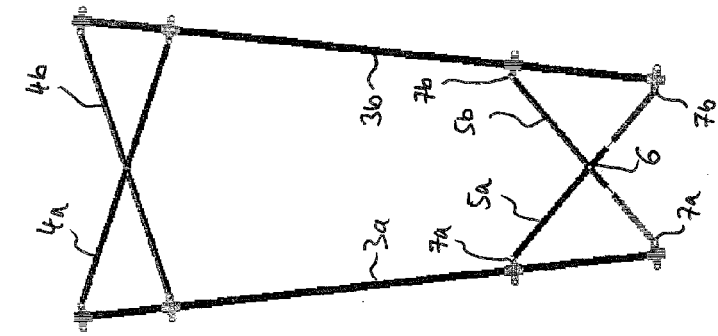
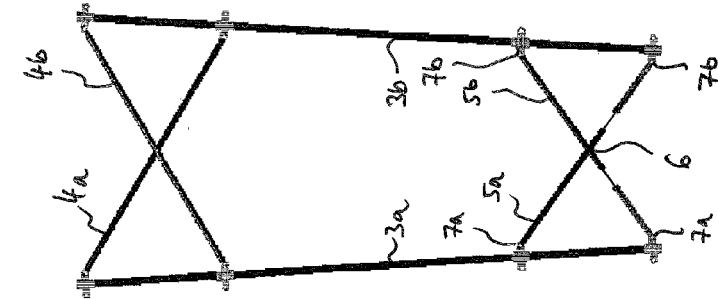
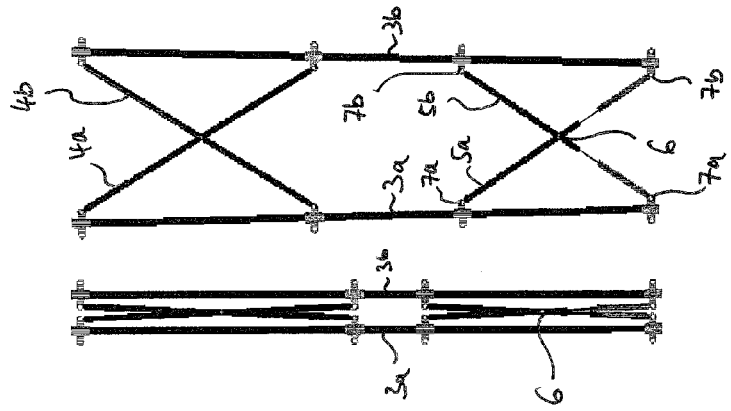

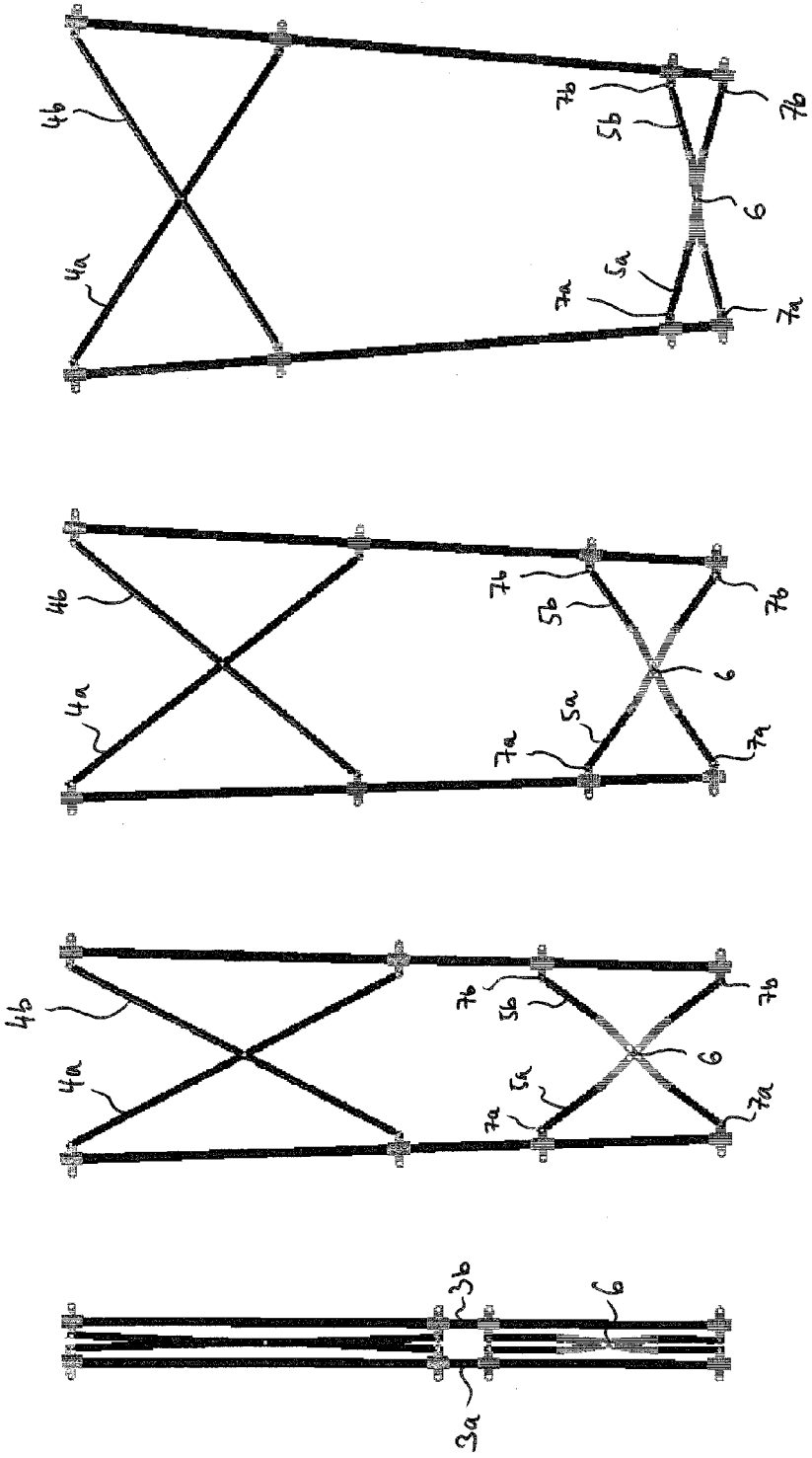

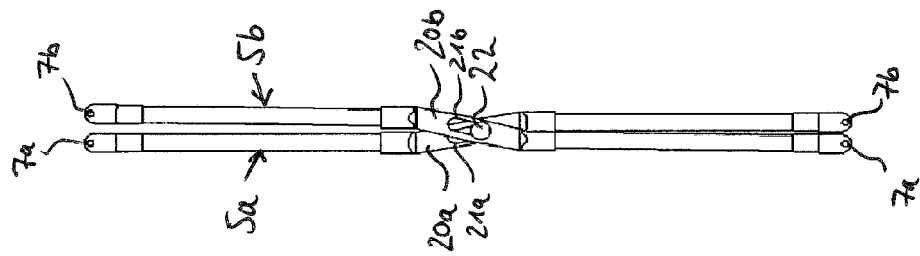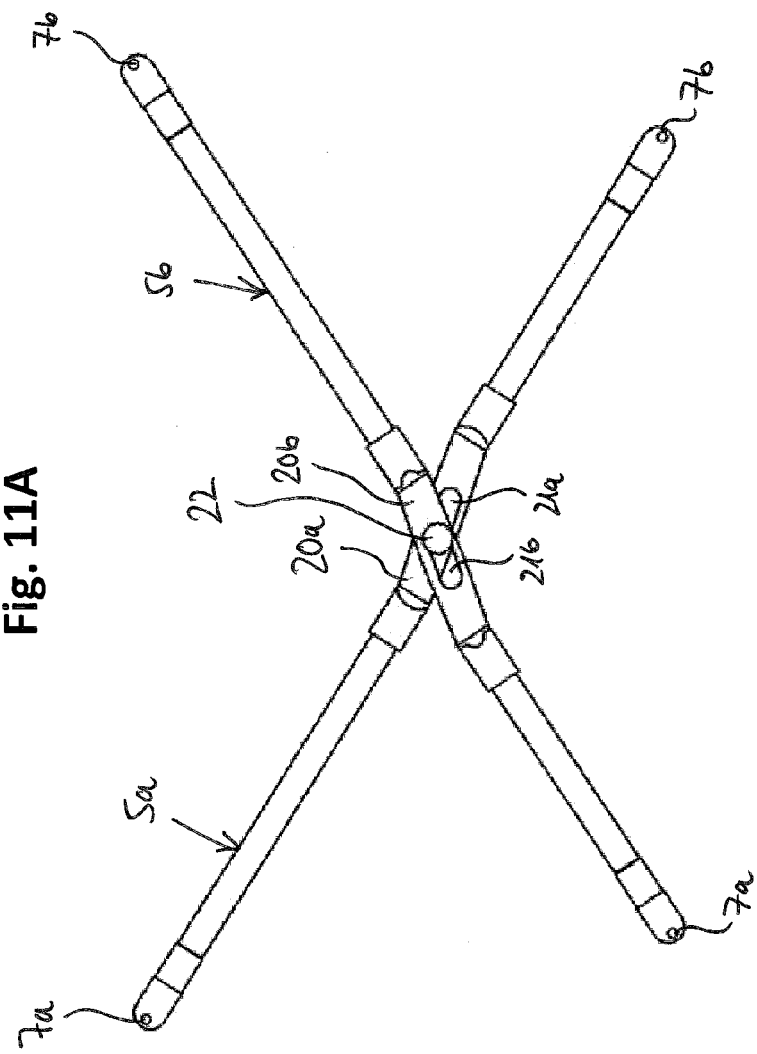

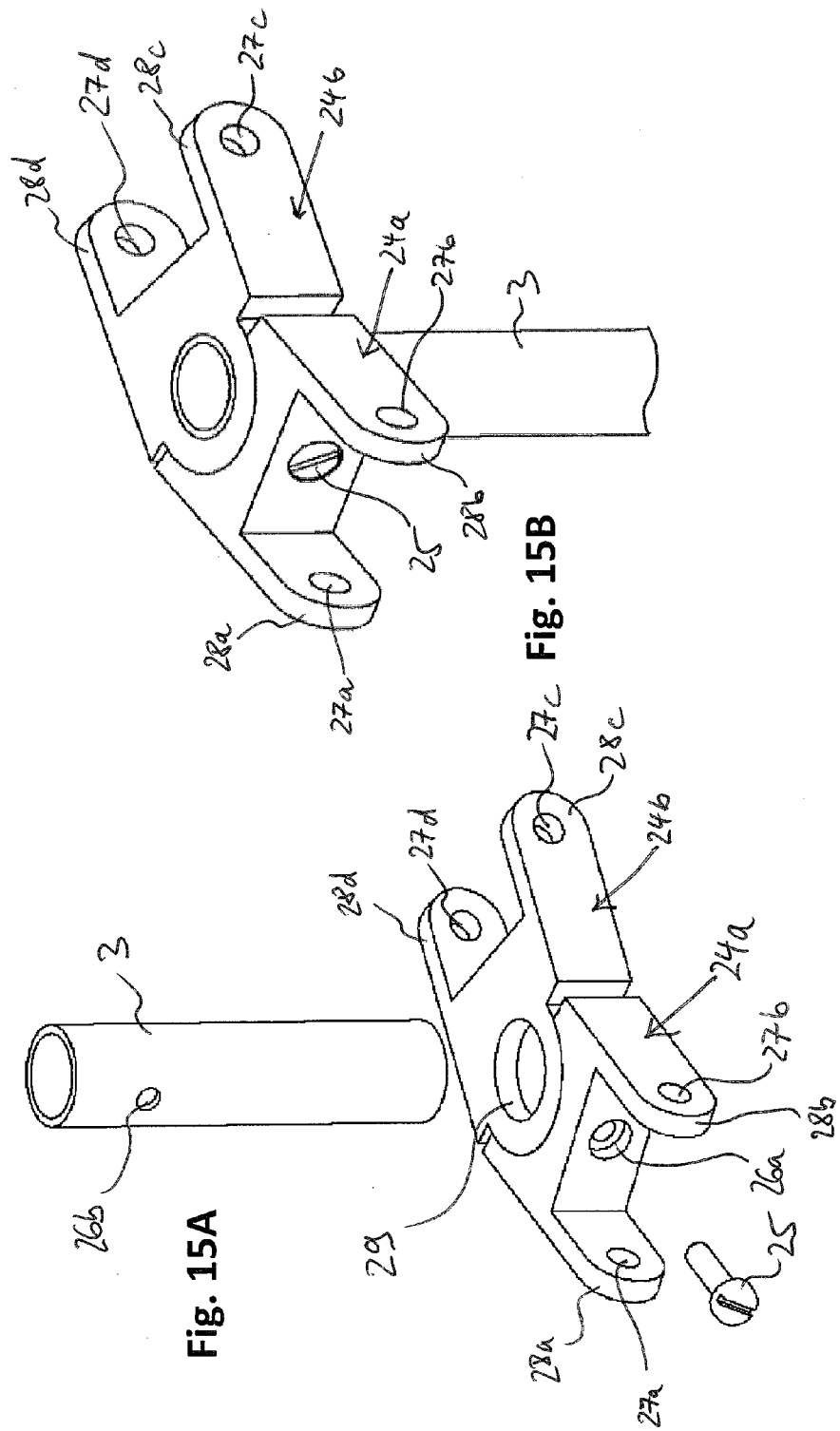

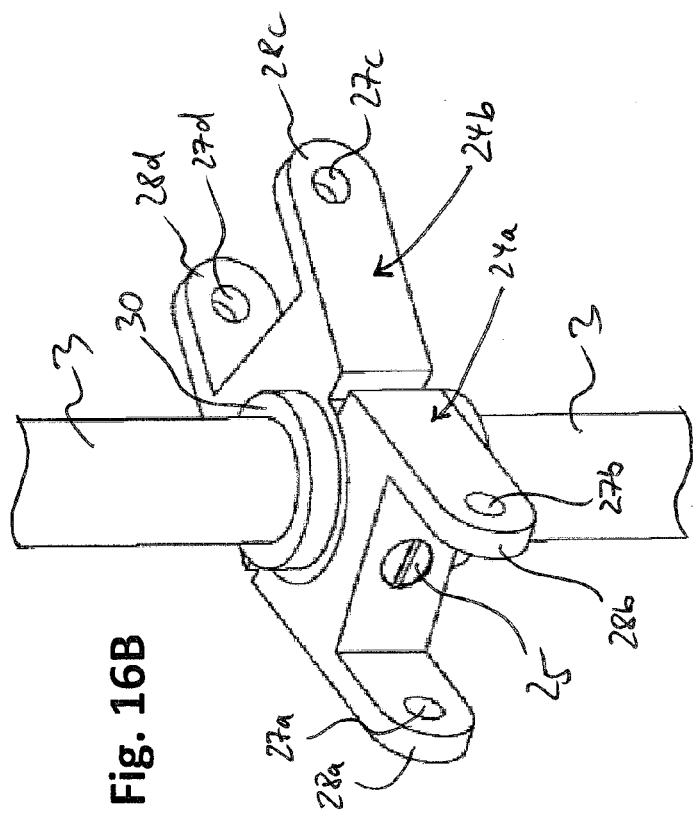
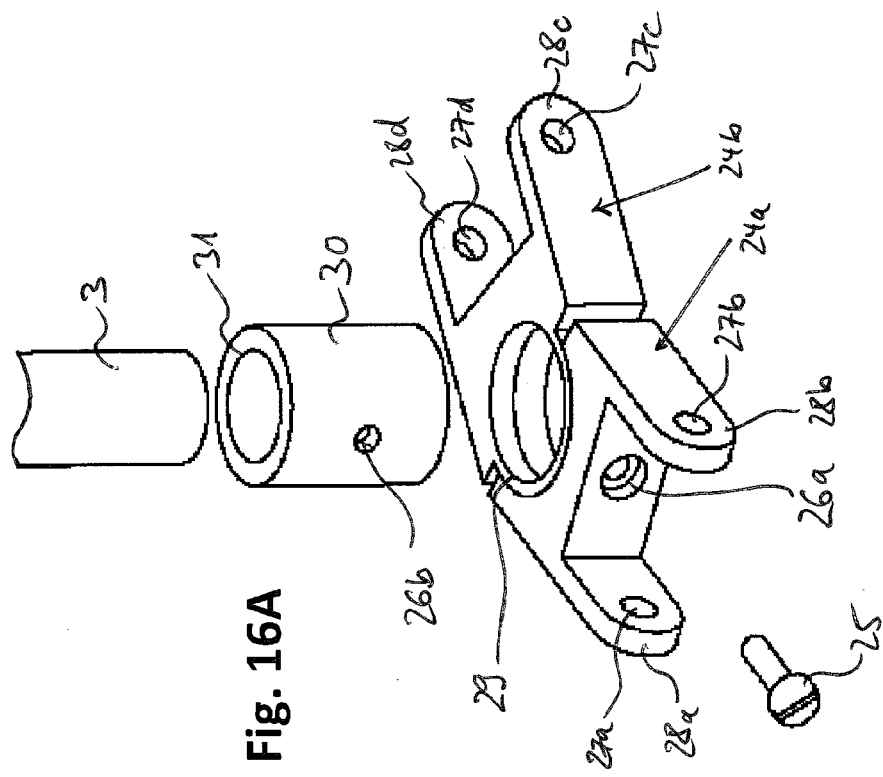
Fig. 16A
Fig. 16B

MECHANICAL SUPPORT RING STRUCTURE

The present invention relates to a mechanical support ring structure, in particular a mechanical support ring structure for supporting a deployable space reflector antenna or deployable space solar reflectors, solar sails or sun shields.

The mechanical support ring structure is convertible from a folded state into a deployed state and comprises a ring-shaped pantograph having a plurality of circumferentially arranged pantograph sections which are deployable for converting the mechanical support ring structure from the folded state into the deployed state, and a plurality of circumferentially arranged support rods, each pantograph section being arranged between a respective pair of support rods, wherein each pantograph section comprises one or more pairs of pantograph rods which intersect crosswise with each other at a respective crossing position, in particular two or more pairs of crosswise intersecting pantograph rods.

BACKGROUND OF THE INVENTION

For use as a mechanical support ring structure for a deployable space reflector antenna, it is known to provide ring-shaped support structures that can be converted, in space after being brought to space in a small-sized compact folded state, from the folded state into a deployed state for supporting a space reflector antenna, see e.g. U.S. Pat. No. 5,680,145. Such mechanical support ring structures can be used for space applications such as for supporting antenna reflectors for telecommunications, scientific experiments and Earth observations, as well as for supporting solar reflectors, solar sails and sun shields.

Also, it is known to provide such mechanical support ring structures on the basis of deployable pantograph mechanisms comprising a single ring-shaped pantograph (see e.g. RU 2 214 659 C2) or, as a double pantograph mechanism, two pantograph mechanisms which may be formed as a ring-shaped double pantograph having intercrossing pantograph lever pairs (see e.g. WO 03/003517 A1) or as upper and lower pantograph mechanisms which are connected by non-pantograph connecting sections (see e.g. GE P 2011 5298 B).

For use in space, e.g. for supporting deployable space reflector antennas, it is aimed at designing and constructing large deployable apertures (e.g. ranging from 4 to 50 m or more in diameter, when being deployed), which can at the same time provide the capabilities to be folded in a small-sized low-mass compact folded state (stowed state) to be efficiently stowed in a spacecraft during launch for the purpose of bringing the structure to space, and to be deployed in space into an expanded deployed state at a high deployment process reliability and deployment accuracy. At the same time, it is aimed at providing a high stiffness and stability of the deployed support structure. In order to provide more stability or for use in different applications, it may intended to provide not only a cylindrically shaped deployed support ring structure but also a conically shaped deployed support ring structure.

However, in the prior art, the known mechanical support ring structure which have a conical shape when being deployed have very complex structures and multi-component deployment mechanisms leading to complex and heavier structures which are larger-sized, when folded, and which need to be deployed in a very complex deployment process involving complicated mechanisms having less deployment reliability and less deployment accuracy. For example, GE P 2011 5298 B describes a conical mechanical support ring structure having a double-pantograph mechanism. However, the deployment process is complex and needs to occur at two stages involving plural components.

At the first stage, two separate double pantograph parts of the mechanical support ring structure are deployed independently (FIGS. 16 and 17 of GE P 2011 5298 B), the two separate double pantograph mechanisms being connected by additional connecting sections for closing to a ring-shaped support structure (the connecting sections are shown in FIGS. 31 to 35 of GE P 2011 5298 B). Then, in the second stage, after deployment of the pantograph sections, the complex multi-component connecting sections are converted for bringing the mechanical support ring structure into the conical deployed state.

As mentioned above, there is the problem that the deployment process of the support ring structure of GE P 2011 5298 B is complex and involves two stages which leads to lowered deployment accuracy and deployment reliability and, due to the additionally provided connecting section, which separate the double pantograph mechanisms, the folded state cannot be provided at small diameter having a compact size (see FIGS. 12 to 15 of GE P 2011 5298 B) and the stability of the deployed structure is lowered.

In view of the above-described problems of the prior art, it is an object of the present invention to provide a mechanical support ring structure which is multifunctional and allows to be deployed into a cylindrically-shaped deployed support ring structure and a conically-shaped deployed support ring structure by a simple, efficient, accurate and reliable deployment mechanism.

It is a further object of the present invention to provide a mechanical support ring structure that can be provided at low mass and with compact size in the folded state. It is a further object of the present invention to provide a mechanical support ring structure that provides high stability and stiffness after being converted into the deployed state.

SUMMARY OF THE INVENTION

In view of the above-mentioned objects of the present invention, there is proposed a mechanical support ring structure according to claim 1, a mechanical support ring structure according to claim 5, a mechanical support ring structure according to claim 6, and a mechanical support ring structure according to claim 15. Dependent claims relate to preferred embodiments of the present invention.

According to a first aspect of the invention, a mechanical support ring structure, which is convertible from a folded state into a deployed state, comprises a ring-shaped pantograph having a plurality of circumferentially arranged pantograph sections which are deployable for converting the mechanical support ring structure from the folded state into the deployed state, and a plurality of circumferentially arranged support rods, each pantograph section being arranged between a respective pair of support rods.

Each pantograph section comprises two or more pairs of crosswise intersecting pantograph rods including a first pair of pantograph rods which intersect crosswise with each other at a respective crossing position, and, for each pantograph section, each pantograph rod of the first pair is pivotably attached with a left end thereof to a left support rod at a left attachment position and is pivotably attached with a right end thereof to a right support rod at a right attachment position.

The pantograph rods of the first pair of crosswise intersecting pantograph rods are respectively configured such that a ratio between a first distance, which is the distance between the crossing position and the left attachment position, and a second distance, which is the distance between the crossing position and the right attachment position, is alterable when converting the mechanical support ring structure from the folded state into the deployed state.

In the following, preferred aspects of the invention will be described. On the one hand, there are embodiments of the invention, which enable to alter the ratio between the first distance to the second distance, which together add up to the length of a respective pantograph rod of the first pair from a left attachment position to a right attachment position, in that the pantograph rods are adapted to alter the length thereof, such as e.g. by the use of expandable mechanisms or retractable mechanisms such as e.g. telescopic mechanisms, telescopic rod portions, pantographs or the like. On the other hand, there are embodiments of the invention which enable to alter the ratio between the first distance to the second distance in that the pair of pantograph rods is configured such as to allow for movement of the crossing position while the length of the rods may remain unaltered so that the sum of the first distance and the second distance may remain constant (or the length can be altered in addition thereto).

Here, it is to be noted that the above aspects relate to the feature that for each pantograph rod of the first pair, the ratio of the first and second distances is alterable. Further, for both pantograph rods, it is intended to adapt the pair such that the ratio between the distance from the left attachment position to the crossing position of the one pantograph rod of the first pair to the distance from the left attachment position to the crossing position of the other pantograph rod of the first pair is alterable and that the ratio between the distance from the right attachment position to the crossing position of the one pantograph rod of the first pair to the distance from the right attachment position to the crossing position of the other pantograph rod of the first pair is alterable.

Moreover, since preferably two or more crosswise intersecting pairs of pantograph rods are provided for each pantograph section, at least one other pair of pantograph rods may have a fixed ratio of first and second distances by having a fixed crossing position and fixed pantograph rod lengths. In case of a plurality of crosswise intersecting pairs of pantograph rods, it is preferable that one other pair of pantograph rods may have a fixed ratio of first and second distances by having a fixed crossing position and fixed pantograph rod lengths and the other pantograph pairs being adapted so as to have alterable ratios.

The above aspects provide the advantage that the mechanical support ring structure can be used to be deployed into a cylindrically shaped deployed state (in which the ratio between the first distance and the second distance is substantially equal to 1 in order to allow for parallel arrangement of the support rods) and that the mechanical support ring structure can be used to be deployed into a conically shaped deployed state (in which the ratio between the first distance and the second distance is typically different from 1 in order to allow for inclined arrangement of the support rods).

Also, the present invention has the advantage that the mechanical support ring structure can be deployed in a reliable, accurate and efficient deployment process in the same manner as into the conical shape without the need for any additional complex multi-component connecting portions that would separate a pantograph and without the need for complex two-step deployment of the conically shaped deployed support ring structure. By contrast, there can be provided a single ring-shaped pantograph having a plurality of pantograph sections that can be reliably and accurately deployed into the conical deployed state, wherein the inclination angle of the conical deployed state with respect to the axial direction of the ring can be adjusted reliably, accurately and efficiently by adapting the ratio between the first distance and the second distance.

In addition, the ring-shaped pantograph can be provided in a very compact small-sized folded state, so that there can be provided the mechanical support ring structure which can be packed advantageously at a very compact size, even if it is intended to be deployed into a conically shaped deployed state, and it further allows to provide a high stability and stiffness in the deployed state.

Accordingly, a reliable and multifunctional mechanical support structure can be provided which is applicable to a large range of different space applications. The support ring structure according to the invention is however not necessarily limited to space applications but may also be used for ground applications, such as e.g. for the use of supporting tent structures or as roof structures of temporary building, or the like.

In the above, according to a simple embodiment of the invention, the ratio between the first distance and the second distance may be alterable in that no mechanical joint is provided at the crossing position of the first pair of crosswise intersecting pantograph rods.

However, according to a preferred aspect of the first aspect above, the ratio between the first distance and the second distance is preferably alterable in that each pantograph rod of the first pair of crosswise intersecting pantograph rods is a telescopic pantograph rod adapted to alter its length, which may also mean that it comprises a telescopic pantograph rod portion adapted to alter its length. This has the advantage that the altering of the ratio between the first distance to the second distance may be controlled very accurately and reliably.

In view of the above, there may be provided, according to a second aspect of the invention, a mechanical support ring structure being convertible from a folded state into a deployed state, comprising a ring-shaped pantograph having a plurality of circumferentially arranged pantograph sections which are deployable for converting the mechanical support ring structure from the folded state into the deployed state, and a plurality of circumferentially arranged support rods, each pantograph section being arranged between a respective pair of support rods, wherein each pantograph section comprises two or more pairs of crosswise intersecting pantograph rods including a first pair of pantograph rods which intersect crosswise with each other at a respective crossing position, and each pantograph rod of the first pair of crosswise intersecting pantograph rods is a telescopic pantograph rod adapted to alter its length, which may also mean that it comprises a telescopic pantograph rod portion adapted to alter its length.

According to another preferred aspect of the first aspect above, the ratio between the first distance and the second distance is preferably alterable in that a mechanical joint at the crossing position of the first pair of crosswise intersecting pantograph rods comprises a first groove, a second groove, and a sliding member extending from the first groove into the second groove which may be adapted to slide independently in the first and second grooves. This provides another highly efficient and rigid structure which allows for accurate deployment while at the same time allowing to alter the ratio between the first distance and the second distance.

Preferably, the first groove is formed in a first joint member of the first pantograph rod and extends substantially in the longitudinal direction of the first pantograph rod and the second groove is preferably formed in a second joint member of the second pantograph rod and extends substantially in the longitudinal direction of the second pantograph rod.

In view of the above, there may be provided, according to a third aspect of the invention, a mechanical support ring structure being convertible from a folded state into a deployed state, comprising a ring-shaped pantograph having a plurality of circumferentially arranged pantograph sections which are deployable for converting the mechanical support ring structure from the folded state into the deployed state, and a plurality of circumferentially arranged support rods, each pantograph section being arranged between a respective pair of support rods, wherein each pantograph section comprises two or more pairs of crosswise intersecting pantograph rods including a first pair of pantograph rods which intersect crosswise with each other at a respective crossing position, wherein a mechanical joint for connecting the pantograph rods of the first pair at the crossing position comprises a first groove, a second groove, and a sliding member extending from the first groove into the second groove, the first groove being formed in a first joint member of a first pantograph rod of the first pair of pantograph rods and extending substantially in the longitudinal direction of the first pantograph rod and the second groove being formed in a second joint member of a second pantograph rod of the first pair of pantograph rods and extending substantially in the longitudinal direction of the second pantograph rod.

In the above aspects, the sliding member is preferably configured to slide in the longitudinal direction of the first groove in the first groove and to slide in the longitudinal direction of the second groove in the second groove.

In all of the above aspects, the respective pair of support rods may comprises a left support rod and a right support rod, and, for each pantograph section, each pantograph rod of the first pair may be pivotably attached with a left end thereof to the left support rod at a left attachment position and/or may be pivotably attached with a right end thereof to the right support rod at a right attachment position.

Preferably, the pantograph rods of the first pair of crosswise intersecting pantograph rods are respectively configured such that a ratio between a first distance, which is the distance between the crossing position and the left attachment position, and a second distance, which is the distance between the crossing position and the right attachment position, is alterable when converting the mechanical support ring structure from the folded state into the deployed state, e.g. either by means of telescopic rods and/or by means of the mechanical joint comprising the first groove, the second groove, and the sliding member extending from the first groove into the second groove.

A first pantograph rod of the first pair of crosswise intersecting pantograph rods may be attached with the left end thereof to a fixed hinge fixedly attached to the left support rod and with the right end thereof to a movable hinge slidably attached to the right support rod, and a second pantograph rod of the first pair of crosswise intersecting pantograph rods may be attached with the left end thereof to a movable hinge slidably attached to the left support rod and with the right end thereof to a fixed hinge fixedly attached to the right support rod.

According to a preferred aspect, each hinge may comprise a left attachment portion for pivot attachment of an end portion of a pantograph rod of a first pantograph section, an intermediate attachment portion for attachment of the hinge to the respective support rod, and/or a right attachment portion for pivot attachment of an end portion of a pantograph rod of a second pantograph section, wherein the left attachment portion and the right attachment portion may be configured to pivot relative to each other about an axis extending through the intermediate attachment portion in a longitudinal direction of the respective support rod.

Each hinge may comprise a left attachment element comprising the left attachment portion and a first fitting portion having a first through hole and/or a right attachment element comprising the right attachment portion a second fitting portion having a second through hole, wherein the first fitting portion of the left attachment element may be fitted into the second fitting portion of the right attachment element such that the first though hole and the second through hole are arranged congruent with each other for receiving the respective support rod, thereby forming the intermediate attachment portion.

In all of the above aspects, the ratio between the first distance and the second distance may substantially equal to 1 in the folded state and different from 1 in the deployed state, thereby preferably leading to a conically shaped deployed mechanical support ring structure; or the ratio between the first distance and the second distance is substantially equal to 1 in the folded state and substantially equal to 1 in the deployed state, thereby preferably leading to a cylindrically shaped deployed mechanical support ring structure. It is to be noted that compact sized folded states can be also provided in case the ratio between the first distance and the second distance is different from 1 in the folded state.

Preferably, the ring-shaped pantograph is closed such that the number of support rods and the number of pantograph sections is the same and each support rod has two adjacent pantograph sections.

Preferably, each pantograph rod of the first pair of crosswise intersecting pantograph rods may comprise two longitudinal rod portions extending in parallel in the longitudinal direction of the respective pantograph rod and a tilted rod portion being arranged between the longitudinal rod portions and being tilted with respect to the longitudinal direction of the pantograph rod, wherein the tilted rod portions of the pantograph rods of the first pair are preferably connected by a pivotable mechanical joint at the crossing position and are preferably tilted in opposite directions. This has the advantage that highly compact sized folded states can be also provided in case the ratio between the first distance and the second distance of one or more pantograph pairs of a pantograph section is different from 1 in the folded state since the support shafts can be arranged substantially in parallel in the folded state, leading to a highly compact cylindrical folded state, even in case ratio between the first distance and the second distance of one or more pantograph pairs of a pantograph section is different from 1 in the folded state.

This above aspect may be also independently provided, for providing a advantageously compact folded state structure, as a mechanical support ring structure being convertible from a folded state into a deployed state, comprising a ring-shaped pantograph having a plurality of circumferentially arranged pantograph sections which are deployable for converting the mechanical support ring structure from the folded state into the deployed state, and a plurality of circumferentially arranged support rods, each pantograph section being arranged between a respective pair of support rods, wherein each pantograph section comprises a first pair of pantograph rods which intersect crosswise with each other at a respective crossing position, wherein each pantograph rod of the first pair of crosswise intersecting pantograph rods comprises two longitudinal rod portions extending in parallel in the longitudinal direction of the respective pantograph rod and a tilted rod portion being arranged between the longitudinal rod portions and being tilted with respect to the longitudinal direction of the pantograph rod, wherein the tilted rod portions of the pantograph rods of the first pair are connected by a pivotable mechanical joint at the crossing position and are tilted in opposite directions.

Preferably, in the above-mentioned aspects, in the folded state of the mechanical support ring structure, each pantograph section may be folded such that the tilted portions of the pantograph rods of the first pair are intersecting at the crossing position and the longitudinal rod portions of the pantograph rods of the first pair are extending substantially in parallel.

In one or more of the above aspects, the ring-shaped pantograph preferably is a double-pantograph, each pantograph section comprising an upper pair of crosswise intersecting pantograph rods and a lower pair of crosswise intersecting pantograph rods, the upper pair or the lower pair being preferably adapted such as described for the above-mentioned first pair. The other pair may have a fixed ratio. This has the advantage that the stiffness and stability of the deployed mechanical support structure can be further improved significantly.

For an aspect which provides the ring-shaped pantograph as a double-pantograph and has a first pair with pantograph rods having an alterable length by means of telescopic rods, another preferred aspect is a mechanical support ring structure which further comprises a deployment mechanism for deploying one or more pantograph sections, wherein the deployment mechanism comprises an actuator configured to pull a cable for deploying at least one upper pair of crosswise intersecting pantograph rods and one lower pair of crosswise intersecting pantograph rods by means of the same cable.

This aspect of the deployment mechanism has the advantage that a deployment process can be made more reliable since upper and lower pantograph rod pairs of the double pantograph can be simultaneously deployed by means of one cable.

According to a preferred aspect thereof, the deployment mechanism is configured to deploy a first lower pair of crosswise intersecting pantograph rods of a first pantograph section and a second upper pair of crosswise intersecting pantograph rods of a second pantograph section.

Then, the first pantograph section may comprise a first upper pair of crosswise intersecting pantograph rods and the first lower pair of crosswise intersecting pantograph rods, and the second pantograph section comprises the second upper pair of crosswise intersecting pantograph rods and a second lower pair of crosswise intersecting pantograph rods, and the first pantograph section is arranged between a first support rod and a second support rod and the second pantograph section is arranged between the second support rod and a third support rod.

Preferably, a first pantograph rod of the first upper pair of crosswise intersecting pantograph rods is attached with the left end thereof to a first upper fixed hinge fixedly attached to an upper end of the first support rod and with the right end thereof to a second upper movable hinge slidably attached to the second support rod, and/or a second pantograph rod of the first upper pair of crosswise intersecting pantograph rods is attached with the left end thereof to a first upper movable hinge slidably attached to the first support rod below the first upper fixed hinge and with the right end thereof to a second upper fixed hinge fixedly attached to an upper end of the second support rod above the second upper movable hinge.

Preferably, a first pantograph rod of the first lower pair of crosswise intersecting pantograph rods is attached with the left end thereof to a first lower fixed hinge fixedly attached to a lower end of the first support rod and with the right end thereof to a second lower movable hinge slidably attached to the second support rod below the second upper movable hinge, and/or a second pantograph rod of the first lower pair of crosswise intersecting pantograph rods is attached with the left end thereof to a first lower movable hinge slidably attached to the first support rod above the first lower fixed hinge and below the first upper movable hinge and with the right end thereof to a second lower fixed hinge fixedly attached to a lower end of the second support rod below the second lower movable hinge.

Preferably, a first pantograph rod of the second upper pair of crosswise intersecting pantograph rods is attached with the left end thereof to the second upper fixed hinge and with the right end thereof to a third upper movable hinge slidably attached to the third support rod, and/or a second pantograph rod of the second upper pair of crosswise intersecting pantograph rods is attached with the left end thereof to the second upper movable hinge and with the right end thereof to a third upper fixed hinge fixedly attached to an upper end of the third support rod above the third upper movable hinge.

Preferably, a first pantograph rod of the second lower pair of crosswise intersecting pantograph rods is attached with the left end thereof to the second lower fixed hinge and with the right end thereof to a third lower movable hinge slidably attached to the third support rod below the third upper movable hinge, and/or a second pantograph rod of the second lower pair of crosswise intersecting pantograph rods is attached with the left end thereof to the second lower movable hinge and with the right end thereof to a third lower fixed hinge fixedly attached to a lower end of the third support rod below the third lower movable hinge.

According to a preferred aspect, the cable may be guided from the lower end of the first support rod to the upper end of the third support rod via a roller attached at the first lower movable hinge, a roller attached at the crossing position of the first lower pair of crosswise intersecting pantograph rods, a roller attached at the second lower movable hinge, a roller attached at the lower end of the second support rod, in particular at the second lower fixed hinge, a roller attached at the upper end of the second support rod, in particular at the second upper fixed hinge, a roller attached at the second upper movable hinge, a roller attached at the crossing position of the second upper pair of crosswise intersecting pantograph rods, and a roller attached at the third upper movable hinge.

For being configured to deploy only the first lower pair of crosswise intersecting pantograph rods and the second upper pair of crosswise intersecting pantograph rods by one single cable, an end of the cable may be fixed to the upper end of the third support rod, in particular to the second upper fixed hinge.

However, according to another preferred aspect, the deployment mechanism may even be further configured to deploy a third lower pair of crosswise intersecting pantograph rods of a third pantograph section which comprises a third upper pair of crosswise intersecting pantograph rods and the third lower pair of crosswise intersecting pantograph rods, and the third pantograph section is arranged between the third support rod and a fourth support rod.

The first pantograph rod of the third upper pair of crosswise intersecting pantograph rods may be attached with the left end thereof to the third upper fixed hinge and with the right end thereof to a fourth upper movable hinge slidably attached to the fourth support rod, and/or a second pantograph rod of the third upper pair of crosswise intersecting pantograph rods may be attached with the left end thereof to the third upper movable hinge and with the right end thereof to a fourth upper fixed hinge fixedly attached to an upper end of the fourth support rod above the fourth upper movable hinge.

A first pantograph rod of the third lower pair of crosswise intersecting pantograph rods may be attached with the left end thereof to the third lower fixed hinge and with the right end thereof to a fourth lower movable hinge slidably attached to the fourth support rod below the fourth upper movable hinge, and/or a second pantograph rod of the third lower pair of crosswise intersecting pantograph rods may be attached with the left end thereof to the third lower movable hinge and with the right end thereof to a fourth lower fixed hinge fixedly attached to a lower end of the fourth support rod below the fourth lower movable hinge.

The cable may then be further guided to the lower end of the fourth support rod via a roller attached at the upper end of the third support rod, in particular at the third upper fixed hinge, a roller attached at the lower end of the third support rod, in particular at the third lower fixed hinge, a roller attached at the third lower movable hinge, a roller attached at the crossing position of the third lower pair of crosswise intersecting pantograph rods, and a roller attached at the fourth lower movable hinge.

When being fixed at the lower end of the fourth support rod, the cable will further deploy the lower pair of pantograph rods of the third pantograph section. Also, in order to also deploy further the upper pair of the third pantograph section and maybe also pairs of further pantograph sections, the mechanism can be continued even further by providing another roller at the lower end of the fourth support rod.

In an alternative embodiment, the cable may also be guided from the lower end of the first support rod to the lower end of the third support rod via a roller attached at the upper end of the first support rod, in particular at the first upper fixed hinge, a roller attached at the first upper movable hinge, a roller attached at the crossing position of the first upper pair of crosswise intersecting pantograph rods, a roller attached at the second upper movable hinge, a roller attached at the upper end of the second support rod, in particular at the second upper fixed hinge, a roller attached at the lower end of the second support rod, in particular at the second lower fixed hinge, a roller attached at the second lower movable hinge, a roller attached at the crossing position of the second lower pair of crosswise intersecting pantograph rods, and a roller attached at the third lower movable hinge.

An end of the cable may then be fixed to the lower end of the third support rod, in particular to the second lower fixed hinge, or the deployment mechanism may be further configured to deploy also the third upper pair of crosswise intersecting pantograph rods of a third pantograph section, wherein the cable may be further guided to the upper end of the fourth support rod via a roller attached at the lower end of the third support rod, in particular at the third lower fixed hinge, a roller attached at the upper end of the third support rod, in particular at the third upper fixed hinge, a roller attached at the third upper movable hinge, a roller attached at the crossing position of the third upper pair of crosswise intersecting pantograph rods, and a roller attached at the fourth upper movable hinge.

By one or more of the above-mentioned aspects, a reliable and multifunctional mechanical support structure can be provided which is applicable to a large range of different space applications. Specifically, the invention allows to provide a mechanical support ring structure which is multifunctional and allows to be deployed into a cylindrically-shaped deployed support ring structure and/or a conically-shaped deployed support ring structure by a simple, efficient, accurate and reliable deployment mechanism. Also, the mechanical support ring structure can be provided at low mass and with compact size in the folded state, having high stability and stiffness after being converted into the deployed state.

BRIEF DESCRIPTION OF THE FIGURES

FIGS. 4A and 4B exemplarily show a mechanical joint at a crossing point of a pantograph rod pair according to an embodiment of the present invention.

FIGS. 7A to 7E exemplarily illustrate a deployment process of a pantograph section of a mechanical support ring structure having a pantograph rod pair according to the first embodiment of the present invention.

FIGS. 10A to 10D exemplarily illustrate a deployment process of a pantograph section of a mechanical support ring structure having a pantograph rod pair according to a second embodiment of the present invention.

FIGS. 11A and 11B exemplarily show a pantograph rod pair according to the second embodiment of the present invention.

FIG. 15A exemplarily shows a view of a fixed hinge according to an embodiment of the present invention prior to attachment to a support rod and FIG. 15B exemplarily shows the fixed hinge of FIG. 15A in an attached state.

FIG. 16A exemplarily shows a view of a sliding hinge according to an embodiment of the present invention prior to attachment to a support rod and FIG. 16B exemplarily shows the sliding hinge of FIG. 16A in an attached state.

Figure 1:
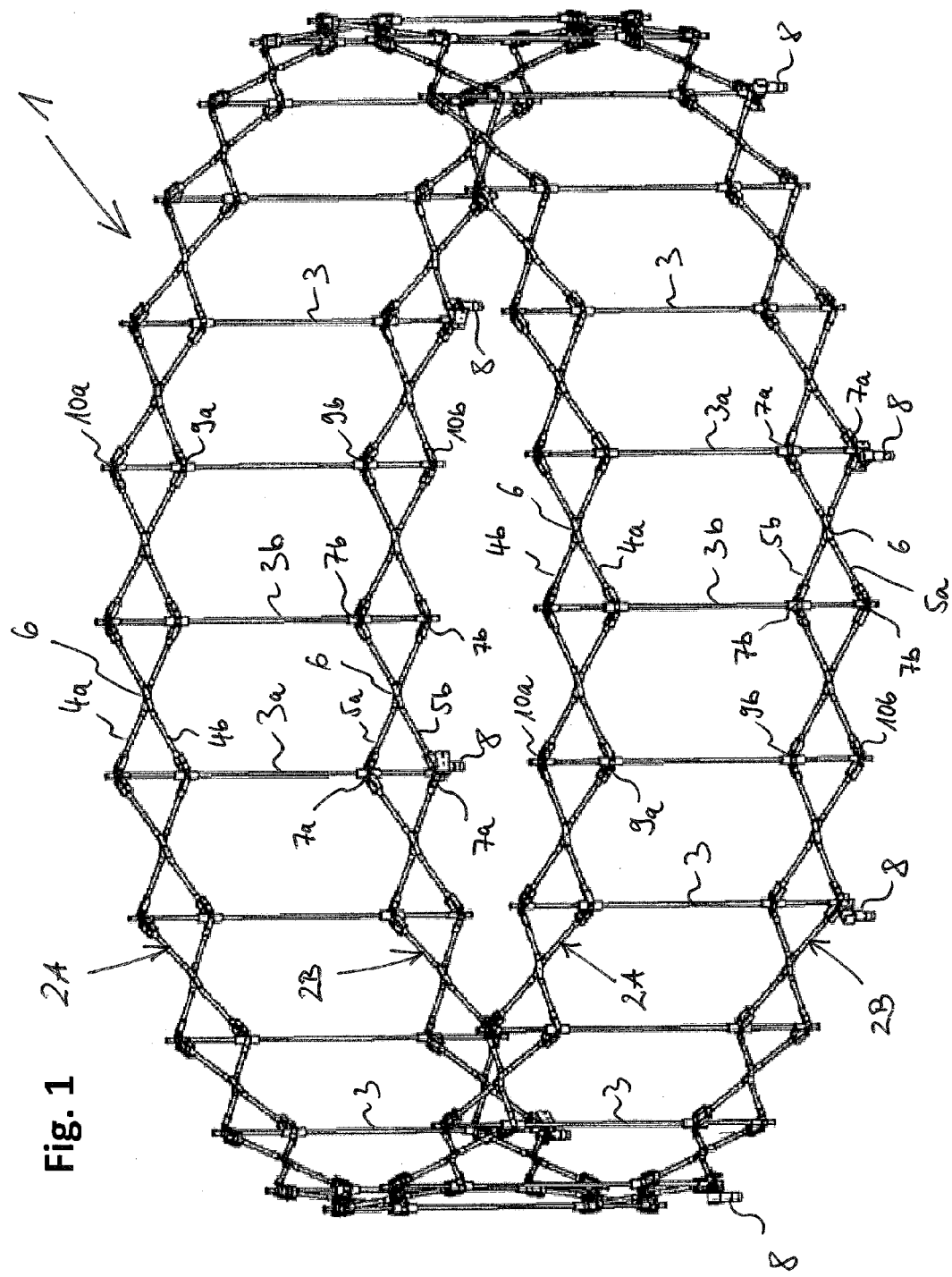
FIG. 1 exemplarily shows a mechanical support ring structure according to an embodiment of the present invention in the deployed state having a cylindrical shape.

DETAILED DESCRIPTION OF THE ACCOMPANYING FIGURES AND OF PREFERRED EMBODIMENTS OF THE PRESENT INVENTION

Preferred embodiments of the present invention will be described below with reference to the accompanying figures.

It is to be noted that the described features and aspects of the embodiments may be modified or combined to form further embodiments of the present invention, unless stated otherwise. Same or similar features of different embodiments are referred to with same reference numerals, and detailed description thereof is omitted for the sake of conciseness of the present specification.

Particularly, features, components and specific details of the structures of the above-described and below-described embodiments may be exchanged or combined to form further embodiments optimized for the respective application. As far as those modifications are readily apparent for an expert skilled in the art they shall be disclosed implicitly by the above and below description without specifying explicitly every possible combination, for the sake of conciseness of the present description.

In all of the below described embodiments, ring-shaped double pantographs are used for exemplary purposes. Exemplarily, the embodiments show support ring structures use a double pantograph mechanism having upper pantograph pairs of an upper pantograph which have fixed length ratios between attachments points and respective crossing positions and lower pantograph pairs of a lower pantograph which have alterable length ratios between attachments points and respective crossing positions. In other embodiments, support ring structures may use a double pantograph mechanism having lower pantograph pairs of a lower pantograph which have fixed length ratios between attachments points and respective crossing positions and upper pantograph pairs of an upper pantograph which have alterable length ratios between attachments points and respective crossing positions. Also, embodiments having pantograph mechanisms having more than two pantograph rod pairs may be provided.

FIG. 1 exemplarily shows a mechanical support ring structure 1 according to an embodiment of the present invention in the deployed state having a cylindrical shape. The mechanical support ring structure 1 is convertible from a folded state into the deployed state shown in FIG. 1 and comprises a ring-shaped pantograph which is a ring-shaped double-pantograph having an upper ring-shaped pantograph 2A and a lower ring-shaped pantograph 2B. In the case of a cylindrical shape, the upper and lower ring-shaped pantographs 2A and 2B have the same diameter as shown in FIG. 1.

The mechanical support ring structure 1 further has a plurality of circumferentially arranged pantograph sections, which are deployable for converting the mechanical support ring structure 1 from the folded state into the deployed state shown in FIG. 1, and a plurality of circumferentially arranged support rods 3. A pantograph section is exemplarily defined as the section of the double pantograph which is arranged between adjacent support rods 3a and 3b such that each pantograph section is arranged between a respective pair of adjacent support rods 3a and 3b.

In FIG. 1, each pantograph section exemplarily comprises an upper pair of crosswise intersecting pantograph rods 4a and 4b and a lower pair of crosswise intersecting pantograph rods 5a and 5b. The pairs of crosswise intersecting pantograph rods intersecting crosswise with each other at respective crossing positions 6.

For each pantograph section, each pantograph rod 4a and 4b of the upper pairs and each pantograph rod 5a and 5b of the lower pairs is pivotably attached with a left end thereof to a respective left support rod 3a at a respective left attachment position 7a and is pivotably attached with a right end thereof to a respective right support rod 3b at a respective right attachment position 7b.

The ring-shaped upper and lower pantographs are closed such that the number of support rods 3 and the number of pantograph sections is the same and each support rod 3 has two adjacent pantograph sections, i.e. the ring-shaped upper and lower pantographs represent pantographs forming a closed ring of adjacent pantograph sections. Accordingly, no complicated multi-component connecting parts for connecting separate pantograph mechanisms need to be provided.

It is to be noted that terms such as "left" and "right" as well as "upper" and "lower" are merely used for reasons of clarity but do not limit the structure since they can be interchanged symmetrically, i.e. "left" can be interchanged with "right", and/or "upper" can be interchanged with "lower". For example, in FIG. 1, "left" and "right" are exemplarily defined viewing pantograph sections from the center of the ring shaped structure, wherein when defining the same structure viewed from outside, a left support rod 3a becomes a right support rod 3a and a right support rod 3b becomes a left support rod 3b. Similarly, when turning FIG. 1 upside down, without changing the structure, the upper pantograph section 2A becomes the lower pantograph section 2B and the lower pantograph section 2B becomes the lower pantograph section 2A.

Further, the terms "left" and "right" are used to define positions of support rods 3 relative to a particular pantograph section. However, it is to be noted that since support rods 3 in FIG. 1 are arranged between adjacent pantograph sections, a left support rod of a first pantograph section becomes the right support rod of a second pantograph section that is arranged to the left of the first pantograph section.

It is to be further noted that the term "cylindrical shape" used in the present description does not mean that the mechanical support ring structure has a circular ring shape but it only intends to specify that the support rods 3 are all substantially arranged in parallel to each other, being directed in the axial direction of the ring shaped mechanical support ring structure 1, i.e. perpendicular to a ring plane of the ring-shaped mechanical support ring structure. A conical shape will be described with reference to FIG. 5 below.

As further exemplarily shown in FIG. 1, each third support rod 3 is provided with an actuator 8 for deploying three pantograph sections by one actuator 8, for example, according to the deployment mechanisms described with reference to FIGS. 8A to 9B or FIG. 14 below.

Figure 2A:
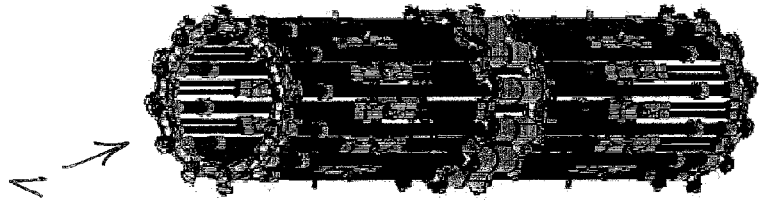
FIGS. 2A to 2C exemplarily illustrate a deployment process of a mechanical support ring structure of the embodiment shown in FIG. 1.
Figure 2B:
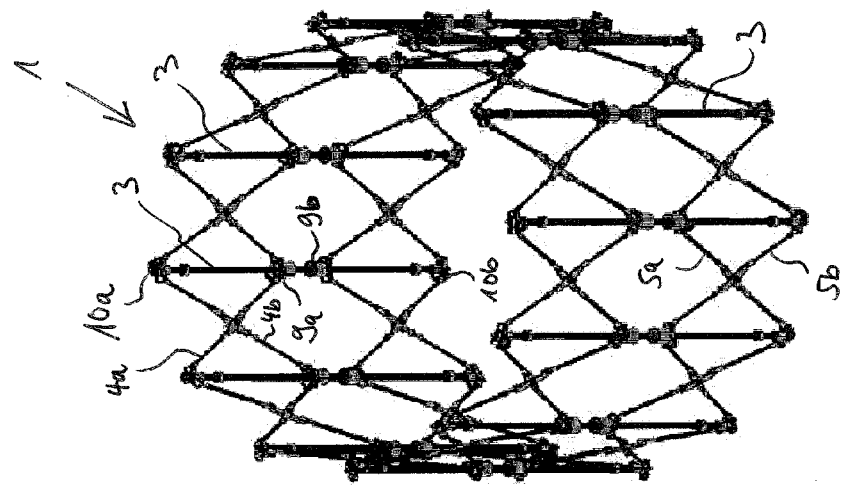
Figure 2C:
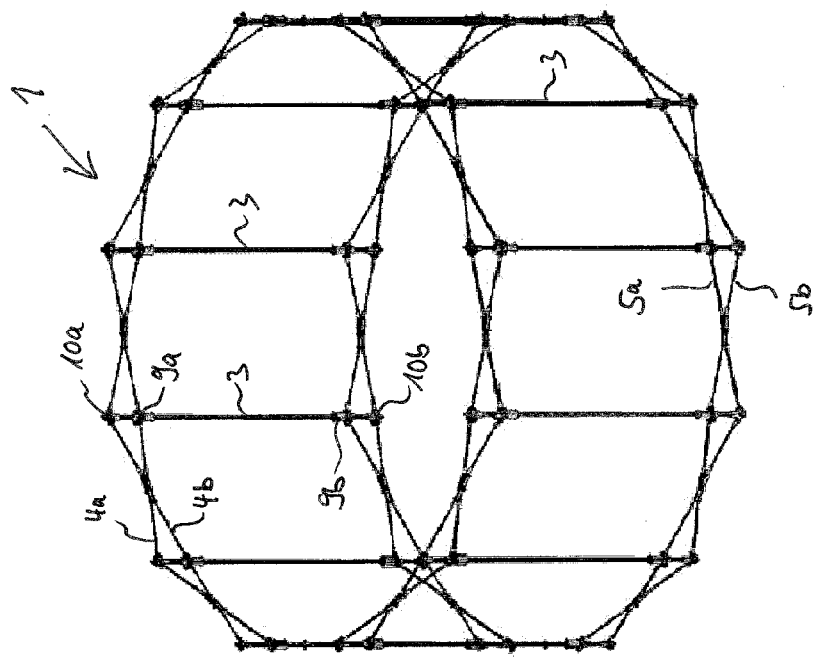

FIGS. 2A to 2C exemplarily illustrate a deployment process of a mechanical support ring structure 1 of the embodiment shown in FIG. 1. FIG. 2A shows the folded state of the mechanical support ring structure 1, which is provided at a very compact size. Each pantograph section, and in particular each upper and lower pair of pantograph rods, is folded in this state as shown in FIG. 2A.

In the folded state, all support rods 3 are arranged substantially parallel and in a compact cylindrical shape (advantageously independent of whether the mechanical support ring structure 1 shall be deployed to a cylindrically-shaped deployed state or to a conically-shaped deployed state). That is, such advantageously compact folded states can be provided for each of the herein below-described embodiments.

FIG. 2B shows an intermediate state of the mechanical support ring structure 1 during the deployment process in which all pantograph sections, and in particular all upper and lower pairs of crosswise intersecting pantographs rods, are simultaneously deployed. FIG. 2C shows the deployed state of the mechanical support ring structure 1 after the deployment process, which will be described in more detail in the following with respect to one single pantograph section.

Figure 3C:
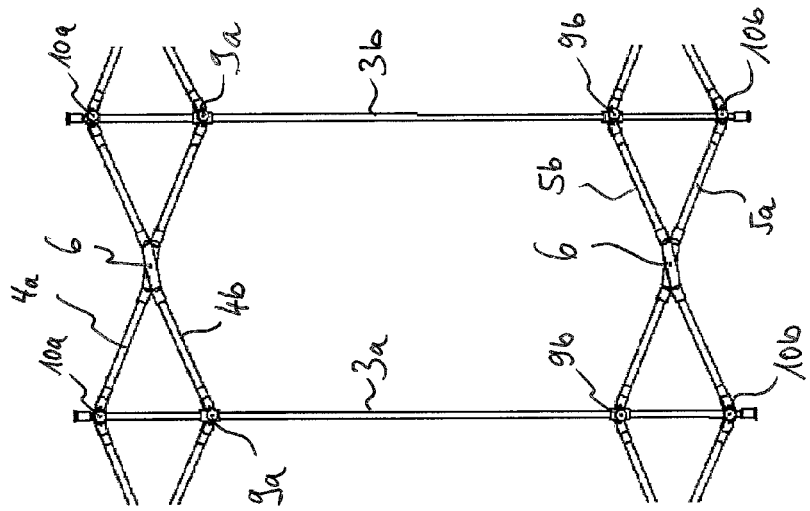
FIGS. 3A to 3C exemplarily illustrate a deployment process of a pantograph section of a mechanical support ring structure of the embodiment shown in FIG. 1.
Figure 3B:
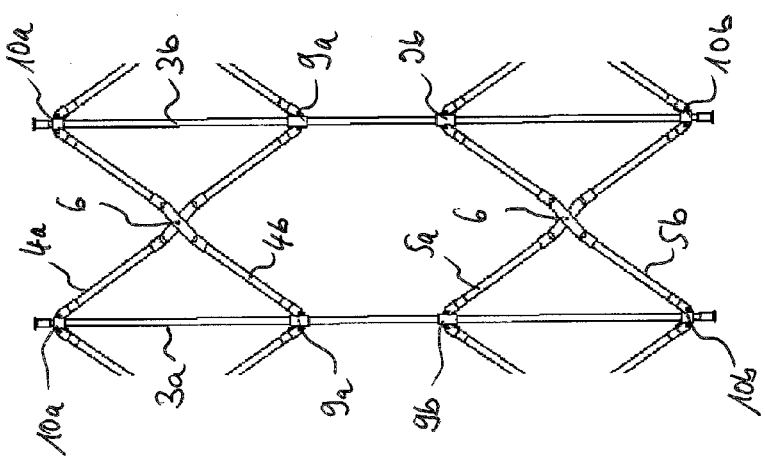
Figure 3A:
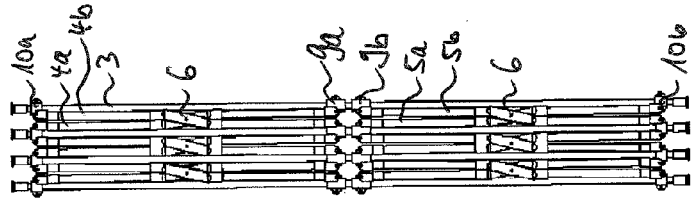

FIGS. 3A to 3C exemplarily illustrate a deployment process of a pantograph section of a mechanical support ring structure 1 of the embodiment shown in FIG. 1. In particular, FIG. 3A exemplarily shows three pantograph sections of a mechanical support ring structure 1 in the folded state prior to the deployment process, FIG. 3B exemplarily shows one pantograph section of the mechanical support ring structure 1 in an intermediate state during the deployment process, and FIG. 3C exemplarily shows one pantograph section of the mechanical support ring structure 1 in the deployed state after the deployment process, here exemplarily a cylindrically shaped deployed state since pantograph rods 3a and 3b are arranged in parallel in the deployed state.

As exemplarily shown in FIGS. 3A to 3C, each support rod 3a and 3b is provided with four hinges 10a, 9a, 9b and 10b for the pivotable attachment of pantograph rods of adjacent pantograph sections. Exemplarily, a respective upper fixed hinge 10a is fixedly attached to the upper end of the support rods 3a and 3b and a lower fixed hinge 10b is fixedly attached to the lower end of the support rods 3a and 3b. Between the fixed hinges 10a and 10b, a respective upper sliding hinge 9a and a respective lower sliding hinge 9b are slidably attached to the support rods 3a and 3b, i.e. the sliding hinges 9a and 9b can slide along the longitudinal direction of the respective support rod 3a or 3b.

As exemplarily shown in FIGS. 3A to 3C, a first pantograph rod 4a of the upper pair of crosswise intersecting pantograph rods 4a and 4b is attached with the left end thereof to the upper fixed hinge 10a of the left support rod 3a and with the right end thereof to the upper sliding movable hinge 9a of the right support rod 3b, and a second pantograph rod 4b of the upper pair of crosswise intersecting pantograph rods 4a and 4b is attached with the left end thereof to the upper sliding hinge 9a of the left support rod 3a and with the right end thereof to the upper fixed hinge 10a of the right support rod 3b. On the other hand, a first pantograph rod 5a of the lower pair of crosswise intersecting pantograph rods 5a and 5b is attached with the left end thereof to the lower sliding hinge 9b of the left support rod 3a and with the right end thereof to the lower fixed hinge 10b of the right support rod 3b and a second pantograph rod 5b of the lower pair of crosswise intersecting pantograph rods 5a and 5b is attached with the left end thereof to the lower fixed hinge 10b of the left support rod 3a and with the right end thereof to the lower sliding movable hinge 9b of the right support rod 3b.

At respective crossing positions 6, the pantograph rods 4a and 4b of the upper pantograph rod pair are pivotably attached to each other and the pantograph rods 5a and 5b of the lower pantograph rod pair are pivotably attached to each other. Accordingly, each pantograph rod can pivot with respect to the left and right support rods 3a and 3b by means of the respective hinges and with respect to the other pantograph rod of its pantograph pair at the crossing position 6. When deploying the pantograph section of the mechanical support ring structure 1, the sliding hinges 9a and 9b respectively slide towards the outer ends of the support rods, and the upper sliding hinge 9a slides towards the upper fixed hinge 10a, and the lower sliding hinge 9b slides towards the lower fixed hinge 10b, as shown in FIGS. 3A to 3C, thereby expanding the respective pantograph sections, in that the pantograph rods which are substantially arranged in parallel in the folded state (see FIG. 3A) pivot about the crossing position 6, wherein adjacent support rods 3a and 3b are shifted away from each other (see FIGS. 3B and 3C) until reaching the deployed state (see FIG. 3C).

As shown in FIG. 1 and also FIGS. 3A to 3C, in the case of deploying the mechanical support ring structure 1 into a cylindrical deployed state, when considering a ratio between a first distance, which is the distance between the crossing position 6 and the left attachment position 7a, and a second distance, which is the distance between the crossing position 6 and the right attachment position 7b, the ratio between the first distance and the second distance is substantially equal to 1 in the folded state and substantially equal to 1 in the deployed state.

FIGS. 4A and 4B exemplarily show a mechanical joint at a crossing point 6 of a pantograph rod pair according to an embodiment of the present invention, which allows to provide a very compact sized folded state of the mechanical support ring structure 1.

Here, the mechanical joint is shown exemplarily for an upper pair of pantograph rods 4a and 4b. The pantograph rod 4a of the upper pair of crosswise intersecting pantograph rods 4a and 4b comprises two longitudinal rod portions 11a and 11b extending in parallel with respect to each other in the longitudinal direction of the pantograph rod 4a. The pantograph rod 4a further comprises a tilted rod portion 11c being arranged between the longitudinal rod portions 11a and 11b and being tilted with respect to the longitudinal direction of the pantograph rod 4a. The respective ends of the tilted rod portion 11c are fixed to the ends of the longitudinal rod portions 11a and 11b as shown in FIGS. 4A and 4B, and due to the tilted rod portion 11c the longitudinal rod portions 11a and 11b are slightly shifted with respect to each other in a direction perpendicular to the longitudinal direction of the pantograph rod 4a.

On the other hand, the pantograph rod 4b of the upper pair of crosswise intersecting pantograph rods 4a and 4b comprises two longitudinal rod portions 12a and 12b extending in parallel with respect to each other in the longitudinal direction of the pantograph rod 4b. The pantograph rod 4b further comprises a tilted rod portion 12c being arranged between the longitudinal rod portions 12a and 12b and being tilted with respect to the longitudinal direction of the pantograph rod 4b. The respective ends of the tilted rod portion 12c are fixed to the ends of the longitudinal rod portions 12a and 12b as shown in FIGS. 4A and 4B, and due to the tilted rod portion 12c the longitudinal rod portions 12a and 12b are slightly shifted with respect to each other in a direction perpendicular to the longitudinal direction of the pantograph rod 4a.

Moreover, the tilted rod portions 11c and 12c of the pantograph rods 4a and 4b are connected by a pivotable mechanical junction 13 at the crossing position 6 and are tilted in opposite directions so that the shift of the two longitudinal rod portions 12a and 12b is directed into an opposite direction of the shift of the two longitudinal rod portions 11a and 11b. Preferably, the amount of the shift perpendicular to the respective longitudinal direction is substantially similar or slightly larger than the thickness of the rods 4a and 4b. Accordingly, as shown in FIG. 4B (and also in FIG. 3A above), the pantograph rods 4a and 4b can be provided such that they are arranged substantially in parallel with respect to each other and substantially in parallel to the support rods 3a and 3b in the folded state of the mechanical support ring structure 1.

Specifically, it becomes possible to provide the folded state of the mechanical support ring structure 1 such that each pantograph section is folded such that the tilted portions 11c and 12c of the pantograph rods 4a and 4b are intersecting at the crossing position 6 and the longitudinal rod portions 11a, 11b, 12a, and 12b are extending substantially in parallel to each other and substantially in parallel to the support rods. Similar mechanical joints can be provided at the lower and/or upper pantograph rod pairs. This enables an advantageously compact-sized structure in the folded state, especially, when similar mechanical joints are provided at the lower and upper pantograph rod pairs.

Figure 5:
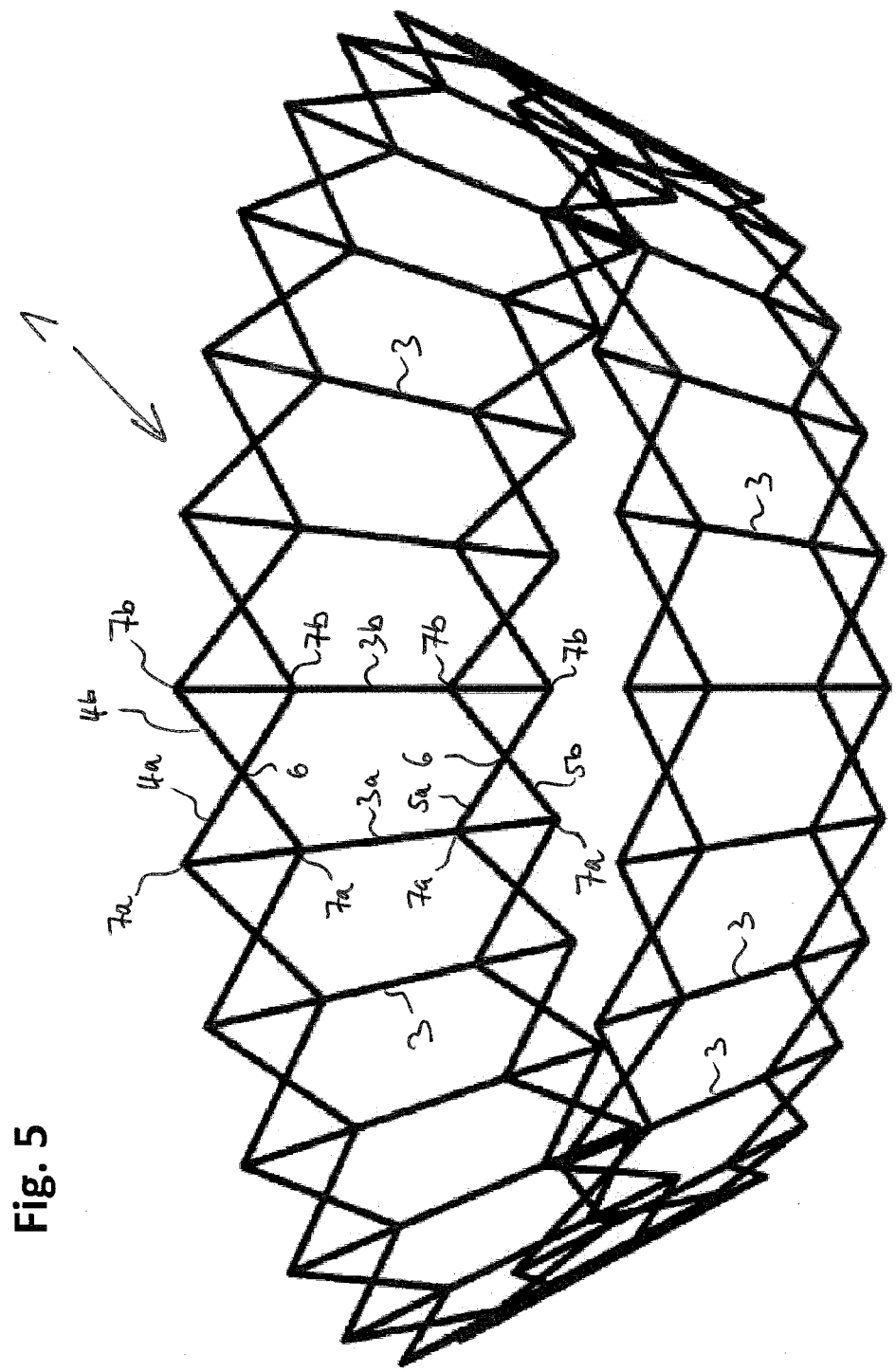
FIG. 5 exemplarily and schematically shows a mechanical support ring structure according to an embodiment of the present invention in the deployed state having a conical shape.

FIG. 5 exemplarily and schematically shows a mechanical support ring structure 1 according to an embodiment of the present invention in the deployed state having a conical shape. Here reference numerals are similar to FIG. 1, and although FIG. 5 is only a schematic figure having fewer details than FIG. 1, detailed features can be provided similar to FIG. 1.

As can be seen in FIG. 5, support rods 3 of the mechanical support ring structure 1 in the deployed state having a conical shape are not parallel but have an inclination angle which leads to a structure that the diameter of the upper pantograph is larger than the diameter of the lower pantograph, and the overall shape of the mechanical support ring structure 1 becomes conical.

According to an aspect of the invention, the pantograph rods 5a and 5b (and/or the pantograph rods 4a and 4b) of the lower pair (and/or upper pair) of crosswise intersecting pantograph rods are respectively configured such that a ratio between the first distance, which is the distance between the crossing position 6 and the left attachment position 7a, and the second distance, which is the distance between the crossing position 6 and the right attachment position 7b, is alterable when converting the mechanical support ring structure 1 from the folded state into the deployed state.

This has the advantage that the mechanical support ring structure 1 can be provided such that the ratio between the first distance and the second distance is substantially equal to 1 in the folded state (leading to the advantage of a highly compact folded state having a compact cylindrical shape as illustrated e.g. in FIG. 2A) and different from 1 in the deployed state, allowing for a rigid conical shape in the deployed state, similar to the structure shown in FIG. 5. For example, the ratio between the first distance and the second distance may be alterable in that no mechanical joint is provided at the crossing position of the upper or lower pair of crosswise intersecting pantograph rods. However, according to more sophisticated and more reliable as well as more robust embodiments of the present invention, at least one of the upper and lower pairs of crosswise intersecting pantograph rods can be provided according to the first and second embodiments described in the following.

Figure 6B:
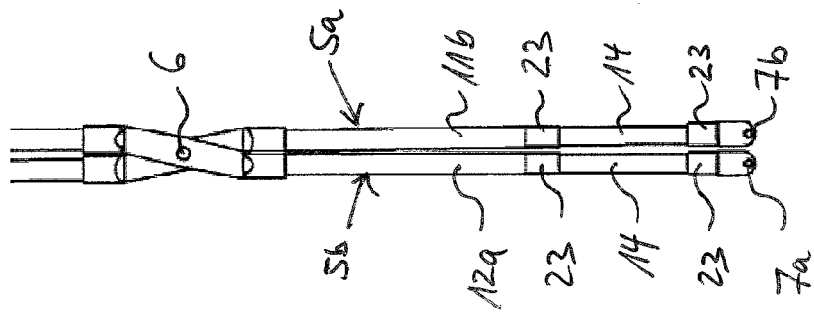
FIGS. 6A and 6B exemplarily show a pantograph rod pair according to a first embodiment of the present invention.
Figure 6A:
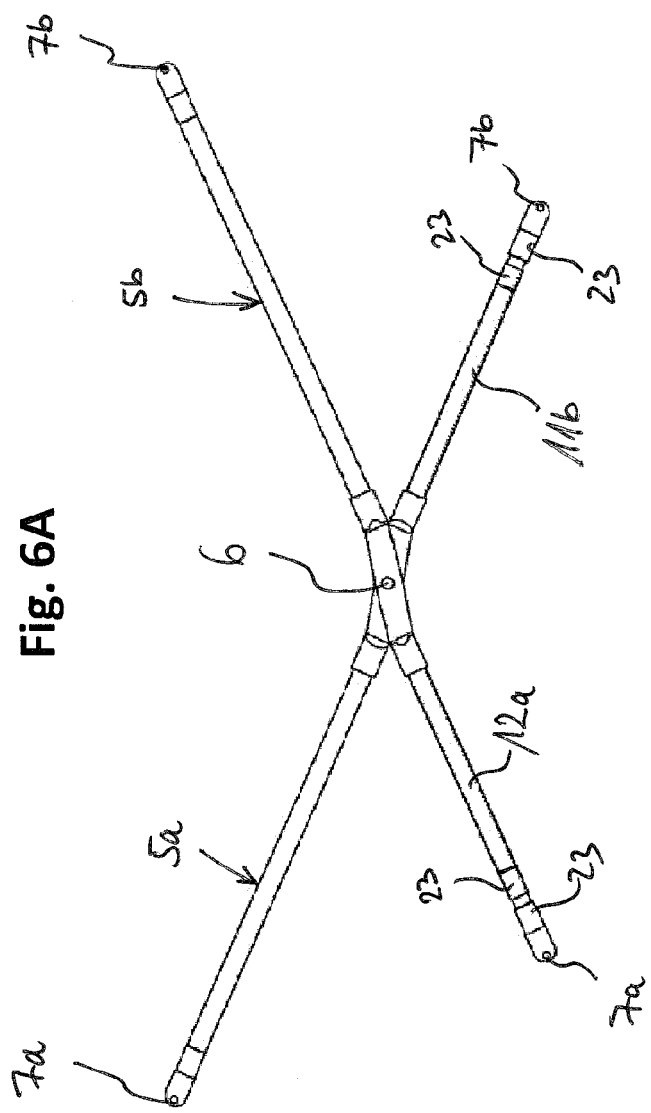

FIGS. 6A and 6B exemplarily show a pantograph rod pair 5a and 5b according to a first embodiment of the present invention. According to the first embodiment, the ratio between the first distance and the second distance is alterable in that each pantograph rod, here exemplarily pantograph rods 5a and 5b of the lower pair of crosswise intersecting pantograph rods, is a telescopic pantograph rod adapted to alter its length.

Exemplarily, in FIG. 6A, the lower rod portion 12a of pantograph rod 5b and the lower rod portion 11b of pantograph rod 5a are formed as telescopic rod portions comprising respective retractable rod portions 14 (see FIG. 6B) which can be retracted into the lower rod portion 12a of pantograph rod 5b and the lower rod portion 11b of pantograph rod 5a, respectively, in order to shorten the length between the left attachment position 7a and the crossing position 6 for pantograph rod 5b and in order to shorten the length between the right attachment position 7b and the crossing position 6 for pantograph rod 5a, when deploying the pantograph section from the folded state (FIG. 6B) to the deployed state (FIG. 6A). In the deployed state, the position of the retracted retractable rod portions 14 can be fixed by muffs 23 in order to increase the stability of the deployed state.

Alternatively or in addition, also the upper rod portion of pantograph rod 5b and the upper rod portion of pantograph rod 5a can be formed as telescopic rod portions comprising respective expandable rod portions which can be expanded out of the upper rod portion of pantograph rod 5b and the upper rod portion of pantograph rod 5a, respectively, in order to lengthen the length between the left attachment position 7a and the crossing position 6 for pantograph rod 5a and in order to lengthen the length between the right attachment position 7b and the crossing position 6 for pantograph rod 5b, when deploying the pantograph section from the folded state to the deployed state.

FIGS. 7A to 7E exemplarily illustrate a deployment process of a pantograph section of a mechanical support ring structure 1 having a pantograph rod pair according to the first embodiment of the present invention described above. FIG. 7A shows the pantograph section in the highly compact folded state, in which the support rods are provided in parallel, and FIG. 7E shows the pantograph section in the deployed state, in which the support rods are provided at an inclination angle leading to a conical shape of the deployed mechanical support ring structure 1 similar to the one shown in FIG. 5.

As mentioned above, in FIGS. 7A to 7E only the lower pantograph pairs have telescopic rod portions so that their respective ratio between the first distance and the second distance is alterable. The upper pairs already have may have a respective fixed ratio between the first distance and the second distance (either already different from 1 or equal to 1, leading to a slight bending of the support rods between the upper and second pantographs), but in other advantageous embodiments, also the upper pantograph pairs may have telescopic rod portions. The upper and/or lower pantograph rod pairs may have mechanical joints as described with reference to FIGS. 4A and 4B.

Figure 8A:
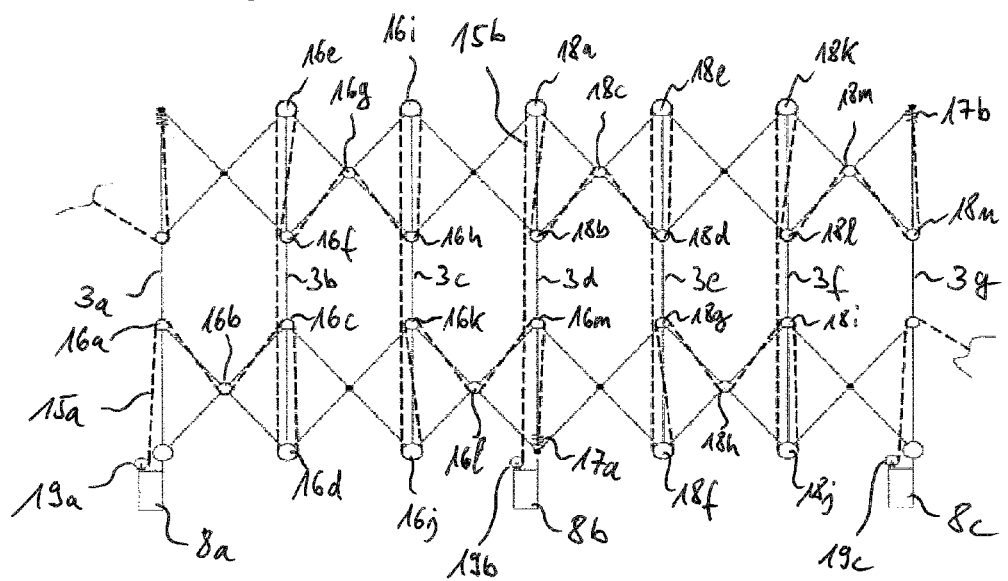
FIGS. 8A and 8B exemplarily illustrate a preferred embodiment of a deployment mechanism of a mechanical support ring structure having a pantograph rod pair according to the first embodiment of the present invention into a cylindrically shaped deployed state.
Figure 8B:
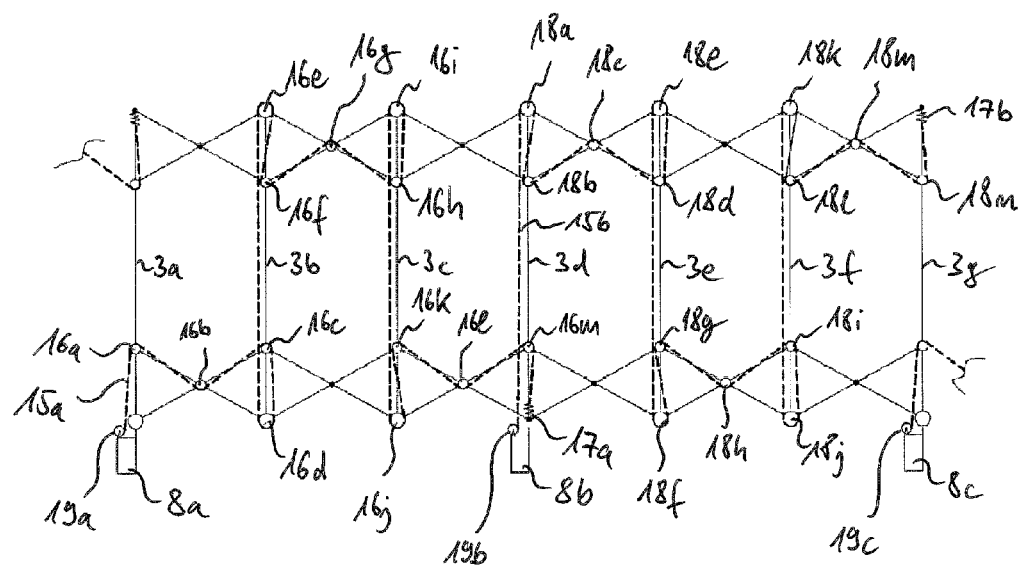

FIGS. 8A and 8B exemplarily illustrate a preferred embodiment of a deployment mechanism of a mechanical support ring structure 1 having a pantograph rod pair according to the first embodiment of the present invention into a cylindrically shaped deployed state. This embodiment of the deployment mechanism has the advantage that a deployment process can be made more reliable since upper and lower pantograph rod pairs of the double pantograph can be simultaneously deployed by means of one cable.

The deployment mechanism of FIGS. 8A and 8B is configured for deploying pantograph pairs of three adjacent pantograph sections being arranged between the support rods 3a to 3d by means of one common cable and one common actuator. For example, the deployment mechanism comprises an actuator 8a which is attached at the lower end of support rod 3a and which is configured to pull one cable 15a for deploying at the same time the lower pantograph rod pair of the pantograph section between support rods 3a and 3b, the upper and lower pantograph rod pairs of the pantograph section between support rods 3b and 3c, and the upper pantograph rod pair of the pantograph section between support rods 3c and 3d by means of the same cable 15a, when pulling the cable 15a by rotating the pulling drum 19a for winding up the cable 15a on the pulling drum 19a. Also, there are provided actuators 8b and 8c and their drums 19b and 19c.

According to the deployment mechanism of FIGS. 8A and 8B, the cable 15a is guided from the drum 19a of the actuator 8a at the lower end of the support rod 3a to the lower end of the support rod 3d, where it is attached by means of a spring 17a, via a roller 16a attached at the lower sliding hinge of the support rod 3a, a roller 16b attached at the crossing position of the lower pair of crosswise intersecting pantograph rods of the pantograph section between support rods 3a and 3b, a roller 16c attached at the lower sliding hinge of the support rod 3b, a roller 16d attached at the lower fixed hinge of the support rod 3b, a roller 16e attached at the upper fixed hinge of the support rod 3b, a roller 16f attached at the upper sliding hinge of the support rod 3b, a roller 16g attached at the crossing position of the upper pair of crosswise intersecting pantograph rods of the pantograph section between support rods 3b and 3c, a roller 16h attached at the upper sliding hinge of the support rod 3c, a roller 16i attached at the upper fixed hinge of the support rod 3c, a roller 16j attached at the lower fixed hinge of the support rod 3c, a roller 16k attached at the lower sliding hinge of the support rod 3c, a roller 16l attached at the crossing position of the lower pair of crosswise intersecting pantograph rods of the pantograph section between support rods 3c and 3d, and a roller 16m attached at the lower sliding hinge of the support rod 3d.

For example, the deployment mechanism further comprises an actuator 8b which is attached at the lower end of support rod 3d and which is configured to pull one cable 15b for deploying at the same time the upper pantograph rod pair of the pantograph section between support rods 3d and 3e, the lower and upper pantograph rod pairs of the pantograph section between support rods 3e and 3f, and the upper pantograph rod pair of the pantograph section between support rods 3f and 3g by means of the same cable 15b, when pulling the cable 15b by rotating the pulling drum 19b for winding up the cable 15b on the pulling drum 19b.

According to the deployment mechanism of FIGS. 8A and 8B, the cable 15b is guided from the drum 19b of the actuator 8b at the lower end of the support rod 3d to the upper end of the support rod 3g, where it is attached by means of a spring 17b, via a roller 18a attached at the upper fixed hinge of the support rod 3d, a roller 18b attached at the upper sliding hinge of the support rod 3d, a roller 18c attached at the crossing position of the upper pair of crosswise intersecting pantograph rods of the pantograph section between support rods 3d and 3e, a roller 18d attached at the upper sliding hinge of the support rod 3e, a roller 18e attached at the upper fixed hinge of the support rod 3e, a roller 18f attached at the lower fixed hinge of the support rod 3e, a roller 18g attached at the lower sliding hinge of the support rod 3e, a roller 18h attached at the crossing position of the lower pair of crosswise intersecting pantograph rods of the pantograph section between support rods 3e and 3f, a roller 18i attached at the lower sliding hinge of the support rod 3f, a roller 18j attached at the lower fixed hinge of the support rod 3f, a roller 18k attached at the upper fixed hinge of the support rod 3e, a roller 18l attached at the upper sliding hinge of the support rod 3f, a roller 18m attached at the crossing position of the upper pair of crosswise intersecting pantograph rods of the pantograph section between support rods 3f and 3g, and a roller 18n attached at the upper sliding hinge of the support rod 3g.

The next deployment mechanism using actuator 8c and drum 19c may have the similar structure as the deployment mechanism using actuator 8a and drum 19a. Alternatively to the above, an end of the cable 15a can be fixed to the upper end of the third support rod 3c, in particular to the upper fixed hinge thereof, or an end of the cable 15b can be fixed to the lower end of the support rod 3f, in particular to the lower fixed hinge thereof. Then, a deployment mechanism can be provided that is configured to deploy one upper pair of a pantograph section and one lower pair of an adjacent pantograph section simultaneously by means of one cable.

Figure 9A:
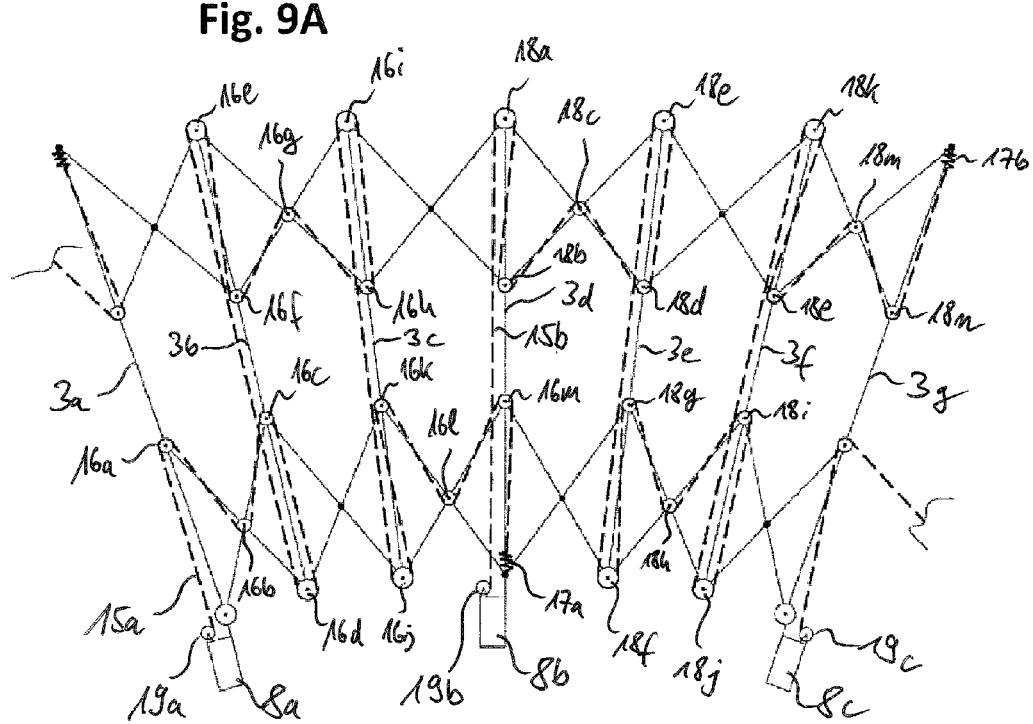
FIGS. 9A and 9B exemplarily illustrate a preferred embodiment of a deployment mechanism of a mechanical support ring structure having a pantograph rod pair according to the first embodiment of the present invention into a conically shaped deployed state.
Figure 9B:
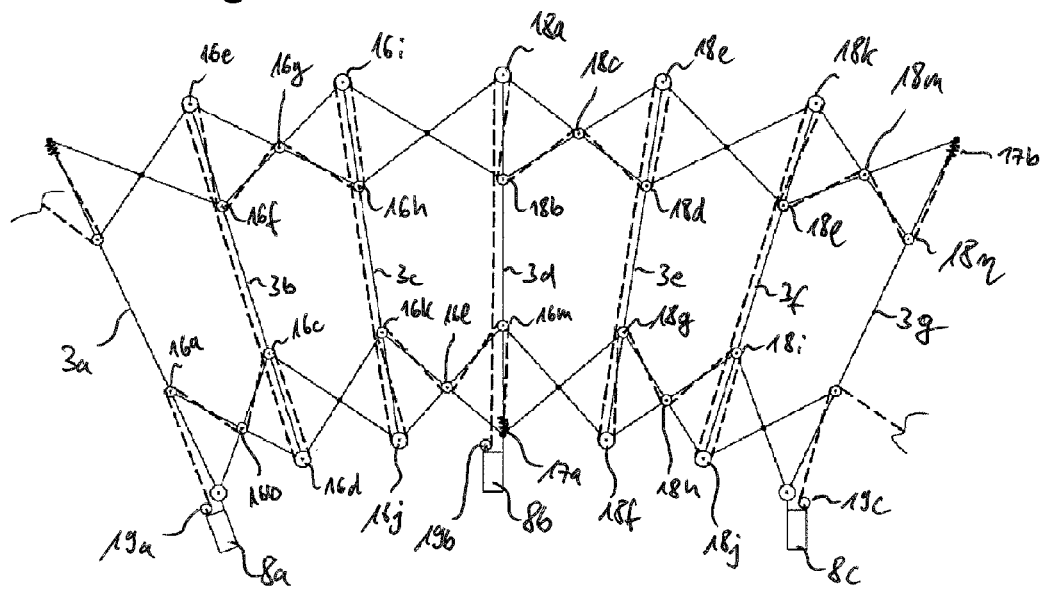
Figure 12A:
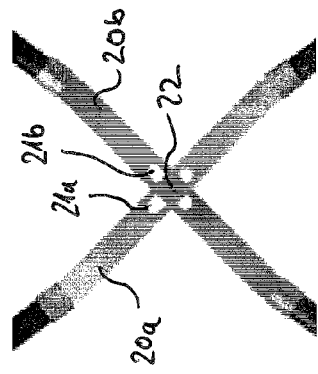
FIGS. 12A to 12D exemplarily show a mechanical joint at a crossing point of a pantograph rod pair according to the second embodiment of the present invention.
Figure 12B:
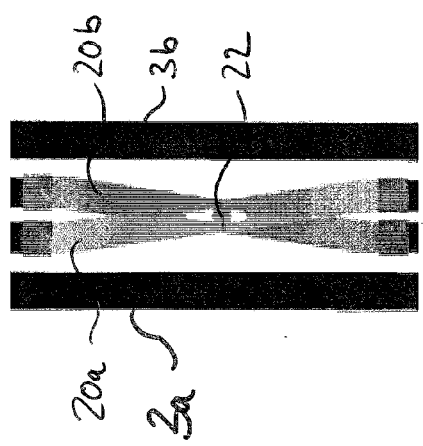
Figure 12C:
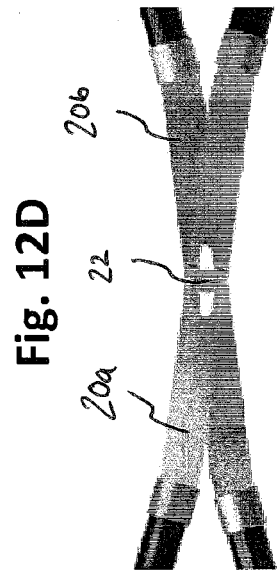
Figure 12D:
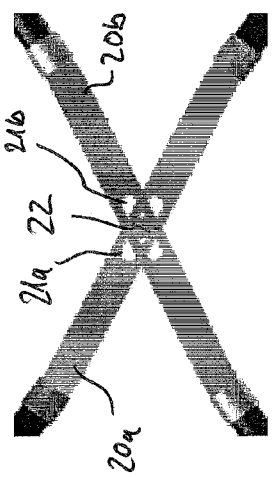
Figure 13A:
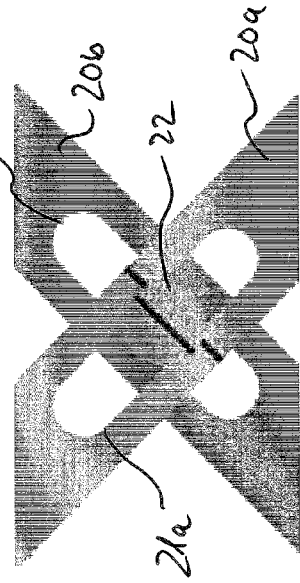
FIGS. 13A to 13D exemplarily show detailed views of the mechanical joint of FIGS. 12A to 12D.
Figure 13B:
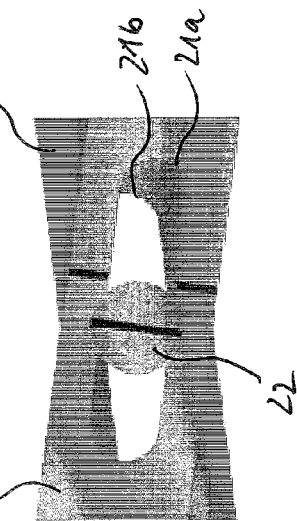
Figure 13C:
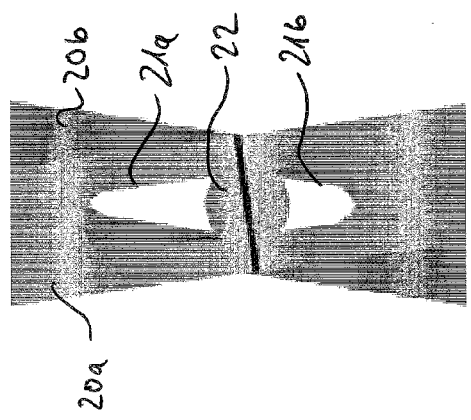
Figure 13D:
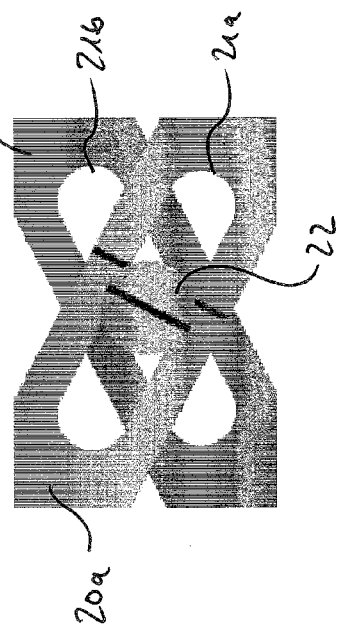

FIGS. 9A and 9B exemplarily illustrate a preferred embodiment of a deployment mechanism of a mechanical support ring structure 1 having a pantograph rod pair according to the first embodiment of the present invention into a conically shaped deployed state. The structure is similar to the structure described with reference to FIGS. 8A and 8B above.

FIGS. 10A to 10D exemplarily illustrate a deployment process of a pantograph section of a mechanical support ring structure 1 having a pantograph rod pair according to a second embodiment of the present invention. FIG. 10A shows the pantograph section in the highly compact folded state, in which the support rods are provided in parallel, and FIG. 10D shows the pantograph section in the deployed state, in which the support rods are provided at an inclination angle leading to a conical shape of the deployed mechanical support ring structure 1 similar to the one shown in FIG. 5. FIGS. 10B and 10C show intermediate states during the deployment process.

Also in this second embodiment, the lower pantograph rods 5a and 5b rods are configured such that a ratio between the first distance, which is the distance between the crossing position 6 and the left attachment position 7a, and the second distance, which is the distance between the crossing position 6 and the right attachment position 7b, is alterable when converting the mechanical support ring structure 1 from the folded state into the deployed state. However, according to the second embodiment, the mechanical joint of the pantograph rods 5a and 5b is configured such as to allow a shift of the crossing position 6 relative to the respective attachment positions 7a and 7b, while the length of the pantograph rods between attachments positions 7a and 7b remains unaltered.

FIGS. 11A and 11B exemplarily show a pantograph rod pair according to the second embodiment of the present invention. The mechanical joint for connecting the pantograph rods 5a and 5b at the crossing position 6 comprises a first groove 21a, a second groove 21b, and a sliding shaft 22 extending from the first groove 21a into the second groove 21b. The first groove 21a is formed in a joint member 20a (which exemplarily is a tilted rod portion similar to the one described with reference to FIGS. 4A and 4B) of the pantograph rod 5a and extends substantially in the longitudinal direction of the pantograph rod 5a (having a slight deviation from the longitudinal direction in accordance with the tilt angle of the joint member 20a). The second groove 21b is formed in a joint member 20b of the pantograph rod 5b and extends substantially in the longitudinal direction of the pantograph rod 5b.

As shown in FIGS. 11A and 11B, the sliding shaft 22 is configured to slide in the longitudinal direction of the first groove 21a inside the first groove 21a and to slide in the longitudinal direction of the second groove 21b inside the second groove 21b. Here, grooves 21a and 21b are exemplarily embodied by through grooves, but is also possible to provide embodiments having grooves that are only opened to the sides of the joint members 20a and 20b which face each other.

In the folded state, as illustrated in FIG. 11B, the sliding shaft 22 is positioned at lower positions of the grooves 21a and 21b, and in the deployed state, as illustrated in FIG. 11A, the sliding shaft 22 is positioned at upper positions of the grooves 21a and 21b, sliding from the lower positions to the upper positions during the deployment process, thereby changing the ratio between the first distance and the second distance. Specifically, the ratio between the respective distance between the attachment position 7a and the crossing position 6, which is defined by the position of the sliding shaft 22, to the respective distance between the attachment position 7b and the crossing position 6 is changed during the deployment process for pantograph rods 5a and 5b.

FIGS. 12A to 12D exemplarily show a mechanical joint at a crossing point of a pantograph rod pair according to the second embodiment of the present invention, similar to the states of the FIGS. 10A to 10D, and FIGS. 13A to 13D exemplarily show detailed views of the mechanical joint of FIGS. 12A to 12D. Although the displacement of the sliding shaft 22 in the through grooves 21a and 21b of the joint members 20a and 20b is less than in FIGS. 11A and 11B, the upward movement of the sliding shaft 22 in the through grooves 21a and 21b, when deploying from the folded state to the deployed state, is clearly visible in FIGS. 13A to 13D on the basis of the position indicating black lines allowing for position comparison.

Figure 14:
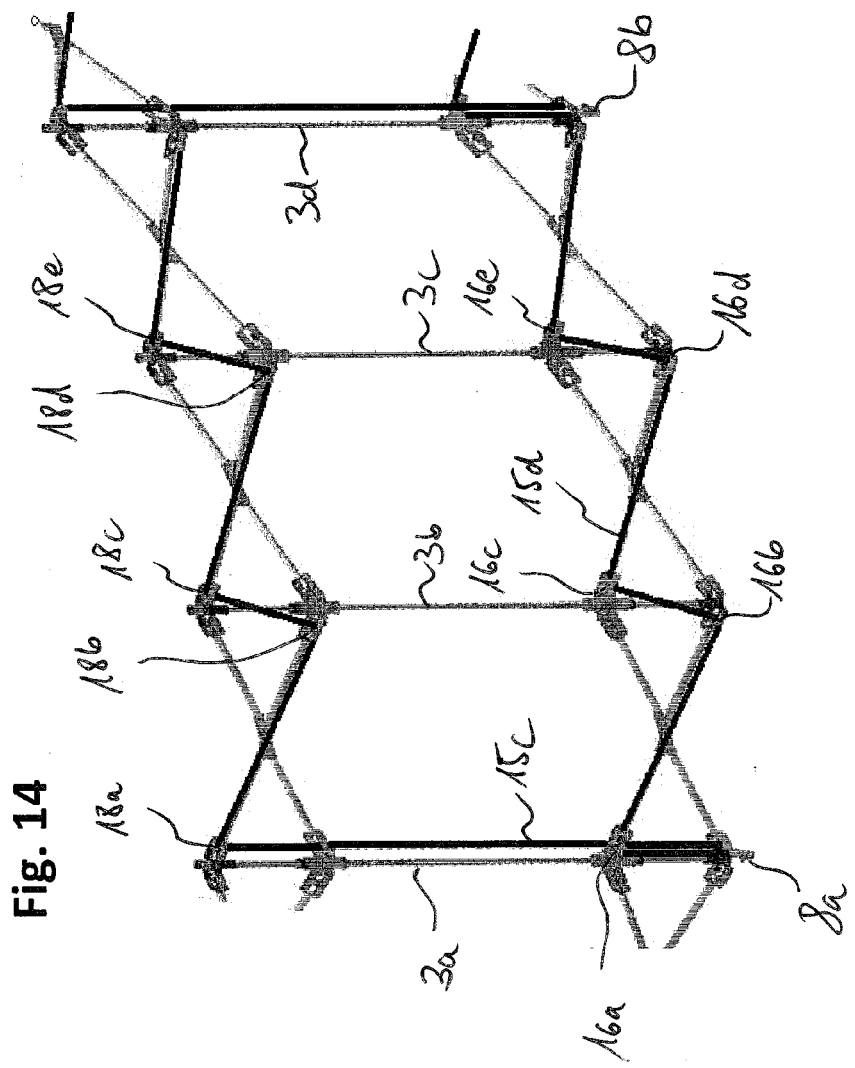
FIG. 14 exemplarily illustrate an alternative embodiment of a deployment mechanism of a mechanical support ring structure having a pantograph rod pair according to the first or second embodiment of the present invention.

FIG. 14 exemplarily illustrate an alternative embodiment of a deployment mechanism of a mechanical support ring structure 1 having a pantograph rod pair according to the first or second embodiment of the present invention. Here, different from the embodiment in FIGS. 8A to 9B, different cables 15c and 15d are used for separately deploying the upper pantograph sections and the lower pantograph sections. Here, the actuator 8a exemplarily attached at the lower end of support rod 3a is configured to deploy the upper pantograph pairs of the three pantograph sections between support rods 3a to 3d by means of the cable 15c guided via rollers 18a, 18b, 18c, 18d and 18e and is, at the same time, configured to deploy the lower pantograph pairs of the three pantograph sections between support rods 3a to 3d by means of the cable 15d guided via rollers 16a, 16b, 16c, 16d and 16e. For deploying a conically shaped mechanical support ring structure 1, two drums of different diameter can be driven by the same actuator 8a at the same rotating speed (leading to different pull speeds and pull ranges for cables 15c and 15d).

FIG. 15A exemplarily shows a view of a fixed hinge according to an embodiment of the present invention prior to attachment to a support rod 3 and FIG. 15B exemplarily shows the fixed hinge of FIG. 15A in an attached state. The fixed hinge comprises two bracket elements 24a and 24b and a through hole 29 as a receiving portion for the support rod 3 to which the fixed hinge is to be mounted, wherein the through hole 29 extends to both bracket elements 24a and 24b, an in the attached state, the support rod 3 is received in the through hole 29 as shown in FIG. 15B.

On outer sides of the brackets 24a and 24b, respective pairs of projection portions 28a and 28b as well as 28c and 28d project perpendicular to the axial direction of the through hole 29 away from a bracket body of the brackets 24a and 24b. Each of the projection portions 28a to 28b has a respective lug 27a, 27b, 27c or 27d for pivotable attachment of pantograph rods. Accordingly, an end of a pantograph rod of a pantograph section left of the support rod 3 can be pivotably attached to the lugs 27a and 27b of the left bracket 24a and an end of a pantograph rod of a pantograph section right of the support rod 3 can be pivotably attached to the lugs 27c and 27d of the left bracket 24b.

The hinge is fixed to the support rod 3 by means of a screw 25 which is inserted extending through a through hole 26a formed in the body of the bracket 24a between the projection portions 28a and 28b into a screw hole 26b formed in the support shaft 3 at the attachment position of the fixed hinge. Still, the brackets 24a and 24b can pivot relative to each other about the axial direction of the through hole 29, i.e. about the longitudinal direction of the support rod 3.

FIG. 16A exemplarily shows a view of a sliding hinge according to an embodiment of the present invention prior to attachment to a support rod 3 and FIG. 16B exemplarily shows the sliding hinge of FIG. 16A in an attached state. Similar to the fixed hinge, the sliding hinge comprises two bracket elements 24a and 24b and a through hole 29. However, the through hole 29 of the sliding hinge has a larger diameter than the through hole 29 of the fixed hinge and receives a cylindrical sliding bush 30 having a through hole 31 as a receiving portion for the support rod 3 to which the sliding hinge is to be mounted. The other features of the sliding hinge are similar to the features of the fixed hinge described above.

In the assembled state and when being mounted to the support rod, the hinge is mounted to the support rod 3 in that the support rod 3 is received in the through hole 31 of the sliding bush 30 and the sliding bush 30 can slide along the support rod 3 in the longitudinal direction thereof. The brackets 24a and 24b are fixed to the sliding bush 30 in that the sliding bush 30 is received in the through hole 29 and fixed to the bracket 24a by means of a screw 25 which is inserted extending through the through hole 26a formed in the body of the bracket 24a between the projection portions 28a and 28b into a screw hole 26b formed in the sliding bush 31. Still, the brackets 24a and 24b can pivot relative to each other about the axial direction of the through hole 31, i.e. about the longitudinal direction of the support rod 3.

Figure 17A:
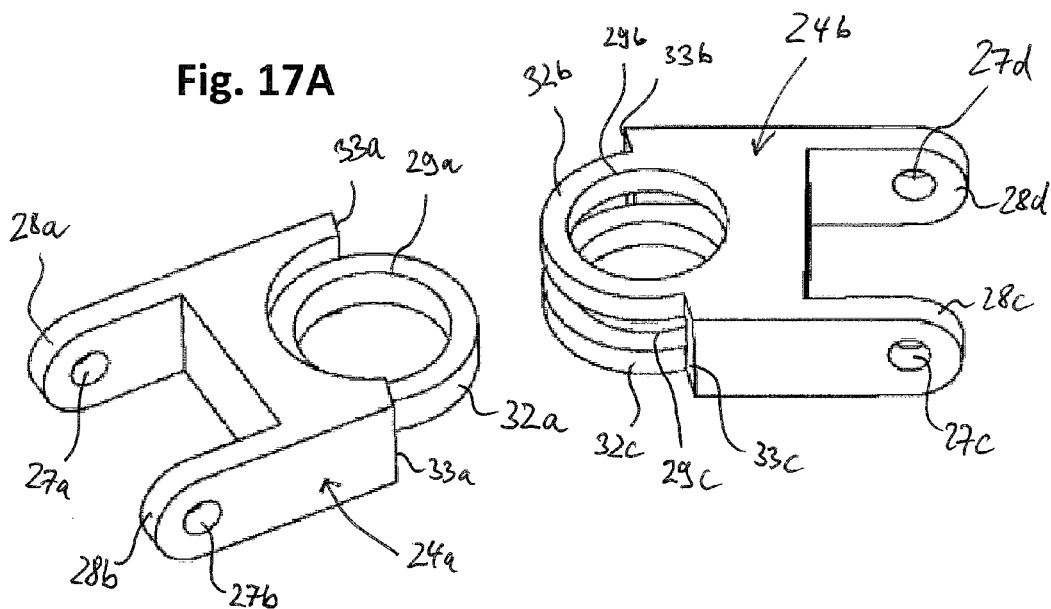
FIG. 17A exemplarily shows an exploded view of the fixed hinge of FIG. 15A and FIGS. 17B to 17D exemplarily show the fixed hinge of FIG. 17A in an assembled state.

FIG. 17A exemplarily shows an exploded view of the fixed hinge of FIG. 15A and FIGS. 17B to 17D exemplarily show the fixed hinge of FIG. 17A in an assembled state. The features of the sliding hinge are similar with the difference that the diameter of the through hole 29 is larger and in that an additional sliding bush 30 is provided as described above.

The inner side of the bracket 24a, i.e. on a side opposite to the projecting portions 28a and 28b, has a ring-shaped fitting portion 32a having an inner through hole 29a. A part of the ring-shaped fitting portion 32a, which exemplarily is substantially half of the ring-shaped fitting portion 32a, projects away from the bracket 24a and the remaining part of the ring-shaped fitting portion 32a is formed in the body of the bracket 24a, wherein above and below the ring-shaped fitting portion 32a, semi-annular receiving portions for fitting portions 32b and 32c of the right bracket 24b are formed.

On the other hand, the inner side of the bracket 24b, i.e. on a side opposite to the projecting portions 28c and 28s, has two ring-shaped fitting portions 32b and 32c having respective inner through holes 29b and 29c. The two ring-shaped fitting portions 32b and 32c are arranged in parallel and the through holes 29b and 29c have the same diameter and are arranged coaxially. Respective parts of the ring-shaped fitting portions 32b and 32c, which exemplarily is substantially half of the ring-shaped fitting portions 32b and 32c, project away from the bracket 24b and the remaining part of the ring-shaped fitting portions 32b and 32c is formed in the body of the bracket 24b, wherein between the ring-shaped fitting portions 32b and 32c, semi-annular receiving portions for the fitting portion 32a of the left bracket 24a are formed.

Figure 17B:
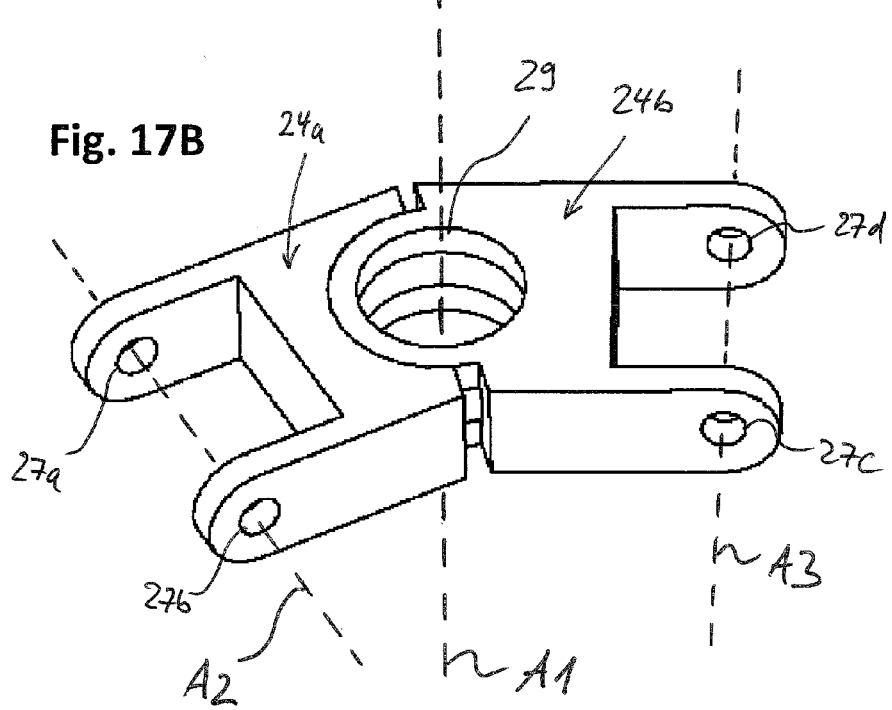

In the assembled state, as shown in FIG. 17B, the ring-shaped fitting portion 32a of the left bracket 24a is received in the receiving portion between the ring-shaped fitting portions 32b and 32c of the right bracket 24b such that the trough holes 29a to 29c, which have the same diameter, are coaxially arranged and congruent with each other and form the through hole 29 of the hinge. The ring-shaped fitting portions 32a to 23c are coaxially arranged in the assembled state. Since the screw 25 described above can extend to the inner side of the through hole 29 between the fitting portions 32b and 32c without being fixed to the right bracket 24b, the bracket 24b can pivot about the axis A1 of the through hole 29 relative to the left bracket 24a. The lugs 27a to 27d define the respective pivot axes A2 and A3 (see FIG. 17B) about which pantograph rods attached to the hinge can pivot.

Figure 17C:
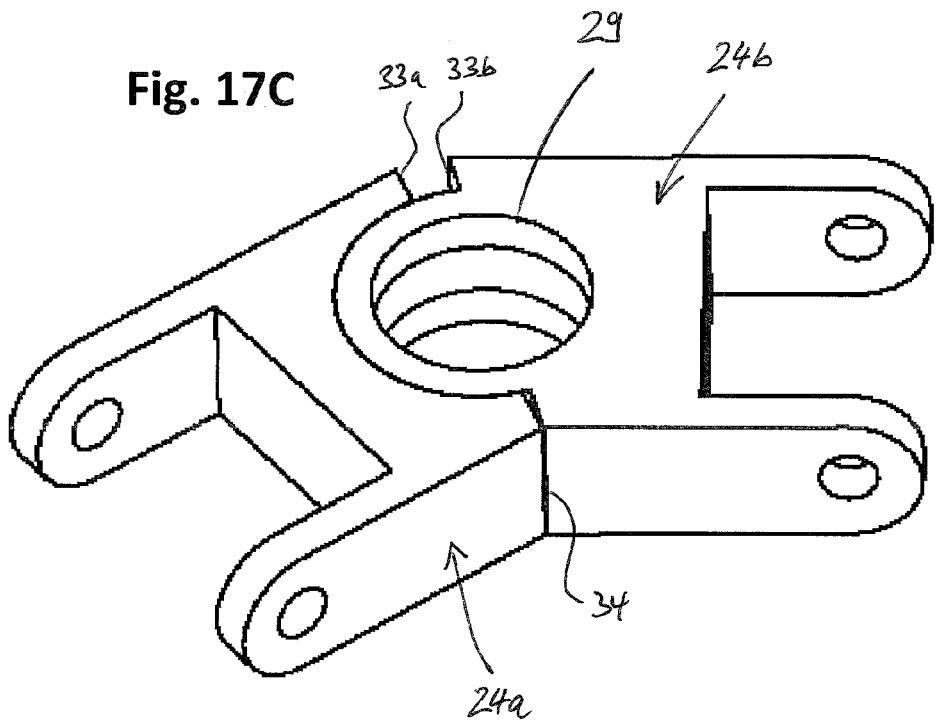
Figure 17D:
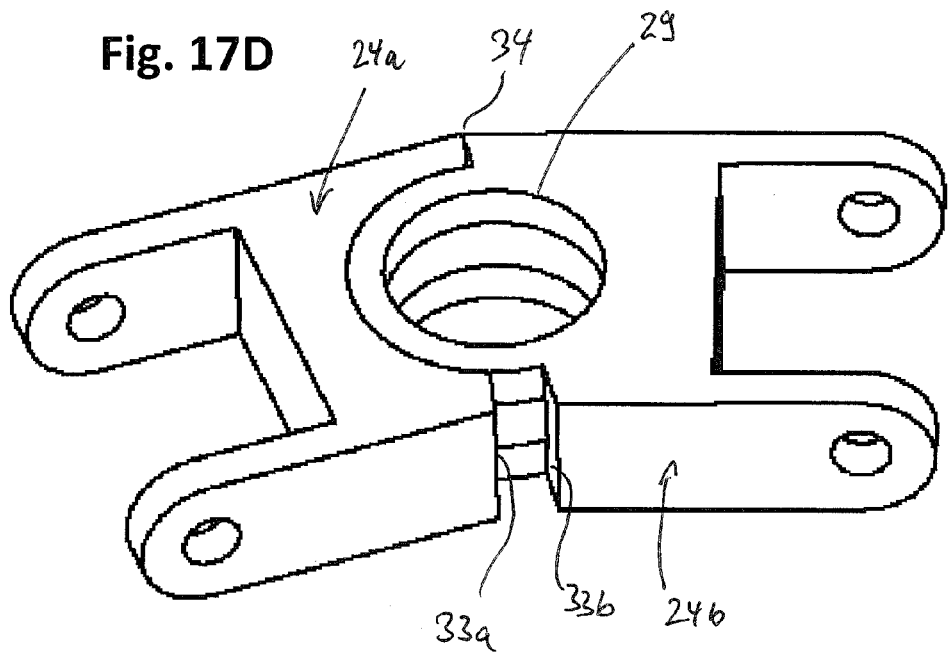

As shown in FIGS. 17C and 17D, the pivot range of the brackets 24a and 24b for pivoting relative to each other about the axis A1 is limited by stopper walls 33a of the body of the bracket 24a and the stopper walls 33b of the body of the bracket 24b, when a stopper wall 33a of the bracket 24a comes in contact with a stopper wall 33b of the bracket 24b at a contact position 34. FIG. 17C shows a minimum pivot angle between the brackets 24a and 24b and FIG. 17D shows a maximum pivot angle between the brackets 24a and 24b. In the folded state, the brackets 24a and 24b may be arranged as shown in FIG. 17C and, in the deployed state, the brackets 24a and 24b may be arranged as shown in FIG. 17D.

An underlying idea of the invention according to one aspect and of embodiments thereof is that the pantograph rods of one or more pairs of crosswise intersecting pantograph rods of a pantograph section of a ring-shaped pantograph are respectively configured such that a ratio between a first distance, which is the distance between the crossing position and the left attachment position of one pantograph rod, and a second distance, which is the distance between the crossing position and the right attachment position of the pantograph rod, is alterable when converting the mechanical support ring structure from the folded state into the deployed state.

Accordingly, above embodiments of the present invention have the advantage that the mechanical support ring structure can be used to be deployed into a cylindrically shaped deployed state (in which the ratio between the first distance and the second distance is substantially equal to 1 in order to allow for parallel arrangement of the support rods) and that the mechanical support ring structure can be used to be deployed into a conically shaped deployed state (in which the ratio between the first distance and the second distance is typically different from 1 in order to allow for inclined arrangement of the support rods).

Also, the present invention has the advantage that the mechanical support ring structure can be deployed in a reliable, accurate and efficient deployment process in the same manner as into the conical shape without the need for any additional complex multi-component connecting portions that would separate a pantograph and without the need for complex two-step deployment of the conically shaped deployed support ring structure. By contrast, there can be provided a single ring-shaped pantograph having a plurality of pantograph sections that can be reliably and accurately deployed into the conical deployed state, wherein the inclination angle of the conical deployed state with respect to the axial direction of the ring can be adjusted reliably, accurately and efficiently by adapting the ratio between the first distance and the second distance.

In addition, the ring-shaped pantograph can be provided in a very compact small-sized folded state, so that there can be provided the mechanical support ring structure which can be packed advantageously at a very compact size, even if it is intended to be deployed into a conically shaped deployed state, and it further allows to provide a high stability and stiffness in the deployed state.

Accordingly, a reliable and multifunctional mechanical support structure can be provided which is applicable to a large range of different space applications. Specifically, the invention allows to provide a mechanical support ring structure which is multifunctional and allows to be deployed into a cylindrically-shaped deployed support ring structure and/or a conically-shaped deployed support ring structure by a simple, efficient, accurate and reliable deployment mechanism. Also, the mechanical support ring structure can be provided at low mass and with compact size in the folded state, having high stability and stiffness after being converted into the deployed state.

Features, components and specific details of the structures of the above-described embodiments may be exchanged or combined to form further embodiments optimized for the respective application. As far as those modifications are readily apparent for an expert skilled in the art they shall be disclosed implicitly by the above and below description without specifying explicitly every possible combination, for the sake of conciseness of the present description.

The invention claimed is:

1. A mechanical support ring structure being convertible from a folded state into a deployed state, comprising:
   a ring-shaped pantograph having a plurality of circumferentially arranged pantograph sections which are deployable for converting the mechanical support ring structure from the folded state into the deployed state, and
   a plurality of circumferentially arranged support rods, each pantograph section being arranged between a respective pair of support rods,
   wherein each pantograph section comprises two or more pairs of crosswise intersecting pantograph rods including a first pair of pantograph rods which intersect crosswise with each other at a respective crossing position, and
   wherein, for each pantograph section, each pantograph rod of the first pair is pivotably attached with a left end thereof to a left support rod at a left attachment position and is pivotably attached with a right end thereof to a right support rod at a right attachment position,
   wherein
   the pantograph rods of the first pair of crosswise intersecting pantograph rods are respectively configured such that a ratio between a first distance, which is the distance between the crossing position and the left attachment position, and a second distance, which is the distance between the crossing position and the right attachment position, is alterable when converting the mechanical support ring structure from the folded state into the deployed state.

2. The mechanical support ring structure according to claim 1, wherein
   the ratio between the first distance and the second distance is alterable in that no mechanical joint is provided at the crossing position of the first pair of crosswise intersecting pantograph rods.

3. The mechanical support ring structure according to claim 1, wherein
   the ratio between the first distance and the second distance is alterable in that each pantograph rod of the first pair of crosswise intersecting pantograph rods is a telescopic pantograph rod adapted to alter its length.

4. The mechanical support ring structure according to claim 1, wherein
   the ratio between the first distance and the second distance is alterable in that a mechanical joint at the crossing position of the first pair of crosswise intersecting pantograph rods comprises:
   a first groove,
   a second groove, and
   a sliding member extending from the first groove into the second groove,
   the first groove being formed in a first joint member of the first pantograph rod and extending substantially in the longitudinal direction of the first pantograph rod and the second groove being formed in a second joint member of the second pantograph rod and extending substantially in the longitudinal direction of the second pantograph rod.

5. A mechanical support ring structure being convertible from a folded state into a deployed state, comprising:
- a ring-shaped pantograph having a plurality of circumferentially arranged pantograph sections which are deployable for converting the mechanical support ring structure from the folded state into the deployed state, and
- a plurality of circumferentially arranged support rods, each pantograph section being arranged between a respective pair of support rods,
- wherein each pantograph section comprises two or more pairs of crosswise intersecting pantograph rods including a first pair of pantograph rods which intersect crosswise with each other at a respective crossing position, wherein
- a mechanical joint for connecting the pantograph rods of the first pair of crosswise intersecting pantograph rods at the crossing position comprises
- a first groove,
- a second groove, and
- a sliding member extending from the first groove into the second groove,
- the first groove being formed in a first joint member of a first pantograph rod of the first pair of pantograph rods and extending substantially in the longitudinal direction of the first pantograph rod and the second groove being formed in a second joint member of a second pantograph rod of the first pair of pantograph rods and extending substantially in the longitudinal direction of the second pantograph rod.

6. The mechanical support ring structure according to claim 4, wherein
- the sliding member is configured to slide in the longitudinal direction of the first groove in the first groove and to slide in the longitudinal direction of the second groove in the second groove.

7. The mechanical support ring structure according to claim 5, wherein
- the respective pair of support rods comprises a left support rod and a right support rod,
- wherein, for each pantograph section, each pantograph rod of the first pair is pivotably attached with a left end thereof to the left support rod at a left attachment position and is pivotably attached with a right end thereof to the right support rod at a right attachment position, and
- wherein the pantograph rods of the first pair of crosswise intersecting pantograph rods are respectively configured such that a ratio between a first distance, which is the distance between the crossing position and the left attachment position, and a second distance, which is the distance between the crossing position and the right attachment position, is alterable when converting the mechanical support ring structure from the folded state into the deployed state.

8. The mechanical support ring structure according to claim 1, wherein
- a first pantograph rod of the first pair of crosswise intersecting pantograph rods is attached with the left end thereof to a fixed hinge fixedly attached to the left support rod and with the right end thereof to a movable hinge slidably attached to the right support rod, and
- a second pantograph rod of the first pair of crosswise intersecting pantograph rods is attached with the left end thereof to a movable hinge slidably attached to the left support rod and with the right end thereof to a fixed hinge fixedly attached to the right support rod.

9. The mechanical support ring structure according to claim 8, wherein each hinge comprises:
- a left attachment portion for pivot attachment of an end portion of a pantograph rod of a first pantograph section,
- an intermediate attachment portion for attachment of the hinge to the respective support rod, and
- a right attachment portion for pivot attachment of an end portion of a pantograph rod of a second pantograph section,
- wherein the left attachment portion and the right attachment portion are configured to pivot relative to each other about an axis extending through the intermediate attachment portion in a longitudinal direction of the respective support rod.

10. The mechanical support ring structure according to claim 9, wherein
- each hinge comprises a left attachment element comprising the left attachment portion and a first fitting portion having a first through hole and a right attachment element comprising the right attachment portion and a second fitting portion having a second through hole, wherein the first fitting portion of the left attachment element is fitted into the second fitting portion of the right attachment element such that the first though hole and the second through hole are arranged congruent with each other for receiving the respective support rod, thereby forming the intermediate attachment portion.

11. The mechanical support ring structure according to claim 1, wherein
- the ratio between the first distance and the second distance is substantially equal to 1 in the folded state and different from 1 in the deployed state; or
- the ratio between the first distance and the second distance is substantially equal to 1 in the folded state and substantially equal to 1 in the deployed state.

12. The mechanical support ring structure according to claim 1, wherein
- the ring-shaped pantograph is closed such that the number of support rods and the number of pantograph sections is the same and each support rod has two adjacent pantograph sections.

13. The mechanical support ring structure according to claim 1, wherein
- each pantograph rod of the first pair of crosswise intersecting pantograph rods comprises two longitudinal rod portions extending in parallel in the longitudinal direction of the respective pantograph rod and a tilted rod portion being arranged between the longitudinal rod portions and being tilted with respect to the longitudinal direction of the pantograph rod,
- wherein the tilted rod portions of the pantograph rods of the first pair are connected by a pivotable mechanical joint at the crossing position and are tilted in opposite directions.

14. The mechanical support ring structure according to claim 13, wherein
- in the folded state of the mechanical support ring structure, each pantograph section is folded such that the tilted portions of the pantograph rods of the first pair are intersecting at the crossing position and the longitudinal rod portions of the pantograph rods of the first pair are extending substantially in parallel.

15. The mechanical support ring structure according to claim 1, wherein
- the ring-shaped pantograph is a double-pantograph, each pantograph section comprising an upper pair of crosswise intersecting pantograph rods and a lower pair of crosswise intersecting pantograph rods, the upper pair or the lower pair being the first pair.

16. The mechanical support ring structure according to claim 15, further comprising a deployment mechanism for deploying one or more pantograph sections, wherein the deployment mechanism comprises an actuator configured to pull a cable for deploying at least one upper pair of crosswise intersecting pantograph rods and one lower pair of crosswise intersecting pantograph rods by means of the same cable; wherein the ratio between the first distance and the second distance is alterable in that each pantograph rod of the first pair of crosswise intersecting pantograph rods is a telescopic pantograph rod adapted to alter its length.

17. The mechanical support ring structure according to claim 16, wherein the deployment mechanism is configured to deploy a first lower pair of crosswise intersecting pantograph rods of a first pantograph section and a second upper pair of crosswise intersecting pantograph rods of a second pantograph section, wherein the first pantograph section comprises a first upper pair of crosswise intersecting pantograph rods and the first lower pair of crosswise intersecting pantograph rods, and the second pantograph section comprises the second upper pair of crosswise intersecting pantograph rods and a second lower pair of crosswise intersecting pantograph rods, and the first pantograph section is arranged between a first support rod and a second support rod and the second pantograph section is arranged between the second support rod and a third support rod, wherein a first pantograph rod of the first upper pair of crosswise intersecting pantograph rods is attached with the left end thereof to a first upper fixed hinge fixedly attached to an upper end of the first support rod and with the right end thereof to a second upper movable hinge slidably attached to the second support rod, and a second pantograph rod of the first upper pair of crosswise intersecting pantograph rods is attached with the left end thereof to a first upper movable hinge slidably attached to the first support rod below the first upper fixed hinge and with the right end thereof to a second upper fixed hinge fixedly attached to an upper end of the second support rod above the second upper movable hinge, wherein a first pantograph rod of the first lower pair of crosswise intersecting pantograph rods is attached with the left end thereof to a first lower fixed hinge fixedly attached to a lower end of the first support rod and with the right end thereof to a second lower movable hinge slidably attached to the second support rod below the second upper movable hinge, and a second pantograph rod of the first lower pair of crosswise intersecting pantograph rods is attached with the left end thereof to a first lower movable hinge slidably attached to the first support rod above the first lower fixed hinge and below the first upper movable hinge and with the right end thereof to a second lower fixed hinge fixedly attached to a lower end of the second support rod below the second lower movable hinge, wherein a first pantograph rod of the second upper pair of crosswise intersecting pantograph rods is attached with the left end thereof to the second upper fixed hinge and with the right end thereof to a third upper movable hinge slidably attached to the third support rod, and a second pantograph rod of the second upper pair of crosswise intersecting pantograph rods is attached with the left end thereof to the second upper movable hinge and with the right end thereof to a third upper fixed hinge fixedly attached to an upper end of the third support rod above the third upper movable hinge, wherein a first pantograph rod of the second lower pair of crosswise intersecting pantograph rods is attached with the left end thereof to the second lower fixed hinge and with the right end thereof to a third lower movable hinge slidably attached to the third support rod below the third upper movable hinge, and a second pantograph rod of the second lower pair of crosswise intersecting pantograph rods is attached with the left end thereof to the second lower movable hinge and with the right end thereof to a third lower fixed hinge fixedly attached to a lower end of the third support rod below the third lower movable hinge, wherein the cable is guided from the lower end of the first support rod to the upper end of the third support rod via a roller attached at the first lower movable hinge, a roller attached at the crossing position of the first lower pair of crosswise intersecting pantograph rods, a roller attached at the second lower movable hinge, a roller attached at the lower end of the second support rod, a roller attached at the upper end of the second support rod, a roller attached at the second upper movable hinge, a roller attached at the crossing position of the second upper pair of crosswise intersecting pantograph rods, and a roller attached at the third upper movable hinge.

18. The mechanical support ring structure according to claim 17, wherein an end of the cable is fixed to the upper end of the third support rod.

19. The mechanical support ring structure according to claim 17, wherein the deployment mechanism is further configured to deploy a third lower pair of crosswise intersecting pantograph rods of a third pantograph section, wherein the third pantograph section comprises a third upper pair of crosswise intersecting pantograph rods and the third lower pair of crosswise intersecting pantograph rods, and the third pantograph section is arranged between the third support rod and a fourth support rod, wherein a first pantograph rod of the third upper pair of crosswise intersecting pantograph rods is attached with the left end thereof to the third upper fixed hinge and with the right end thereof to a fourth upper movable hinge slidably attached to the fourth support rod, and a second pantograph rod of the third upper pair of crosswise intersecting pantograph rods is attached with the left end thereof to the third upper movable hinge and with the right end thereof to a fourth upper fixed hinge fixedly attached to an upper end of the fourth support rod above the fourth upper movable hinge, wherein a first pantograph rod of the third lower pair of crosswise intersecting pantograph rods is attached with the left end thereof to the third lower fixed hinge and with the right end thereof to a fourth lower movable hinge slidably attached to the fourth support rod below the fourth upper movable hinge, and a second pantograph rod of the third lower pair of crosswise intersecting pantograph rods is attached with the left end thereof to the third lower movable hinge and with the right end thereof to a fourth lower fixed hinge fixedly attached to a lower end of the fourth support rod below the fourth lower movable hinge, and wherein the cable is further guided to the lower end of the fourth support rod via a roller attached at the upper end of the third support rod, a roller attached at the lower end of the third support rod, a roller attached at the third lower movable hinge, a roller attached at the crossing position of the third lower pair of crosswise intersecting pantograph rods, and a roller attached at the fourth lower movable hinge.

20. The mechanical support ring structure according to claim 16, wherein
the deployment mechanism is configured to deploy a first upper pair of crosswise intersecting pantograph rods of a first pantograph section and a second lower pair of crosswise intersecting pantograph rods of a second pantograph section,
wherein the first pantograph section comprises the first upper pair of crosswise intersecting pantograph rods and a first lower pair of crosswise intersecting pantograph rods, and the second pantograph section comprises a second upper pair of crosswise intersecting pantograph rods and the second lower pair of crosswise intersecting pantograph rods, and the first pantograph section is arranged between a first support rod and a second support rod and the second pantograph section is arranged between the second support rod and a third support rod,
wherein a first pantograph rod of the first upper pair of crosswise intersecting pantograph rods is attached with the left end thereof to a first upper fixed hinge fixedly attached to an upper end of the first support rod and with the right end thereof to a second upper movable hinge slidably attached to the second support rod, and a second pantograph rod of the first upper pair of crosswise intersecting pantograph rods is attached with the left end thereof to a first upper movable hinge slidably attached to the first support rod below the first upper fixed hinge and with the right end thereof to a second upper fixed hinge fixedly attached to an upper end of the second support rod above the second upper movable hinge,
wherein a first pantograph rod of the first lower pair of crosswise intersecting pantograph rods is attached with the left end thereof to a first lower fixed hinge fixedly attached to a lower end of the first support rod and with the right end thereof to a second lower movable hinge slidably attached to the second support rod below the second upper movable hinge, and a second pantograph rod of the first lower pair of crosswise intersecting pantograph rods is attached with the left end thereof to a first lower movable hinge slidably attached to the first support rod above the first lower fixed hinge and below the first upper movable hinge and with the right end thereof to a second lower fixed hinge fixedly attached to a lower end of the second support rod below the second lower movable hinge,
wherein a first pantograph rod of the second upper pair of crosswise intersecting pantograph rods is attached with the left end thereof to the second upper fixed hinge and with the right end thereof to a third upper movable hinge slidably attached to the third support rod, and a second pantograph rod of the second upper pair of crosswise intersecting pantograph rods is attached with the left end thereof to the second upper movable hinge and with the right end thereof to a third upper fixed hinge fixedly attached to an upper end of the third support rod above the third upper movable hinge,
wherein a first pantograph rod of the second lower pair of crosswise intersecting pantograph rods is attached with the left end thereof to the second lower fixed hinge and with the right end thereof to a third lower movable hinge slidably attached to the third support rod below the third upper movable hinge, and a second pantograph rod of the second lower pair of crosswise intersecting pantograph rods is attached with the left end thereof to the second lower movable hinge and with the right end thereof to a third lower fixed hinge fixedly attached to a lower end of the third support rod below the third lower movable hinge,
wherein the cable is guided from the lower end of the first support rod to the lower end of the third support rod via a roller attached at the upper end of the first support rod, a roller attached at the first upper movable hinge, a roller attached at the crossing position of the first upper pair of crosswise intersecting pantograph rods, a roller attached at the second upper movable hinge, a roller attached at the upper end of the second support rod, a roller attached at the lower end of the second support rod, a roller attached at the second lower movable hinge, a roller attached at the crossing position of the second lower pair of crosswise intersecting pantograph rods, and a roller attached at the third lower movable hinge.

21. The mechanical support ring structure according to claim 20, wherein
an end of the cable is fixed to the lower end of the third support rod.

22. The mechanical support ring structure according to claim 20, wherein
the deployment mechanism is further configured to deploy a third upper pair of crosswise intersecting pantograph rods of a third pantograph section,
wherein the third pantograph section comprises the third upper pair of crosswise intersecting pantograph rods and a third lower pair of crosswise intersecting pantograph rods, and the third pantograph section is arranged between the third support rod and a fourth support rod,
wherein a first pantograph rod of the third upper pair of crosswise intersecting pantograph rods is attached with the left end thereof to the third upper fixed hinge and with the right end thereof to a fourth upper movable hinge slidably attached to the fourth support rod, and a second pantograph rod of the third upper pair of crosswise intersecting pantograph rods is attached with the left end thereof to the third upper movable hinge and with the right end thereof to a fourth upper fixed hinge fixedly attached to an upper end of the fourth support rod above the fourth upper movable hinge,
wherein a first pantograph rod of the third lower pair of crosswise intersecting pantograph rods is attached with the left end thereof to the third lower fixed hinge and with the right end thereof to a fourth lower movable hinge slidably attached to the fourth support rod below the fourth upper movable hinge, and a second pantograph rod of the third lower pair of crosswise intersecting pantograph rods is attached with the left end thereof to the third lower movable hinge and with the right end thereof to a fourth lower fixed hinge fixedly attached to a lower end of the fourth support rod below the fourth lower movable hinge, and
wherein the cable is further guided to the upper end of the fourth support rod via a roller attached at the lower end of the third support rod, a roller attached at the upper end of the third support rod, a roller attached at the third upper movable hinge, a roller attached at the crossing position of the third upper pair of crosswise intersecting pantograph rods, and a roller attached at the fourth upper movable hinge.

* * * * *